US010135687B2

(12) United States Patent
Kashyap et al.

(10) Patent No.: US 10,135,687 B2
(45) Date of Patent: Nov. 20, 2018

(54) VIRTUAL GROUP POLICY BASED FILTERING WITHIN AN OVERLAY NETWORK

(71) Applicant: LENOVO ENTERPRISE SOLUTIONS (SINGAPORE) PTE. LTD., Singapore (SG)

(72) Inventors: Vivek Kashyap, Beaverton, OR (US); Sridhar Samudrala, Beaverton, OR (US); David L. Stevens, Jr., Hillsboro, OR (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 571 days.

(21) Appl. No.: 14/148,247

(22) Filed: Jan. 6, 2014

(65) Prior Publication Data
US 2015/0195137 A1    Jul. 9, 2015

(51) Int. Cl.
*H04L 12/24*  (2006.01)
*H04L 29/12*  (2006.01)
(Continued)

(52) U.S. Cl.
CPC ........ *H04L 41/0893* (2013.01); *H04L 12/185* (2013.01); *H04L 12/1886* (2013.01);
(Continued)

(58) Field of Classification Search
None
See application file for complete search history.

(56) References Cited

U.S. PATENT DOCUMENTS 7,865,586 B2    1/2011  Cohn
8,370,834 B2    2/2013  Edwards et al.
(Continued)

FOREIGN PATENT DOCUMENTS

EP    1441475 B1    11/2007

OTHER PUBLICATIONS

Nakagawa et al, "A Management Method of IP Multicast in Overlay Networks Using OpenFlow", HotSDN'12—Proceedings of the 1st ACm Intl' Workshop on Hot Topics in Software Defined Networks, pp. 91-96, Helsinki, Aug. 13, 2012, 6 pages.
(Continued)

*Primary Examiner* — Christopher M Crutchfield
*Assistant Examiner* — Thinh D Tran
(74) *Attorney, Agent, or Firm* — Brandon C. Kennedy; Jason A. Friday; Kennedy Lenart Spraggins LLP

(57) ABSTRACT

A virtual switch connected to at least one virtual machine of multiple virtual machines communicatively connected through an overlay network, receives a data packet, each of the virtual machines configured within a separate one of multiple virtual groups in the overlay network, the data packet comprising a packet header comprising at least one address. The virtual switch receives a virtual group identifier for the at least one address from at least one address resolution service returning the virtual group identifier and a resolved address for the at least one address, in response to an address resolution request for the at least one address. The virtual switch sends the data packet through the virtual switch to the resolved address only if the virtual group identifier is allowed according to a filtering policy applied by the virtual switch for a particular virtual group identified by the virtual group identifier.

15 Claims, 9 Drawing Sheets

(51) Int. Cl.
*H04L 12/18* (2006.01)
*H04L 12/761* (2013.01)

(52) U.S. Cl.
CPC ........ *H04L 61/103* (2013.01); *H04L 61/2069* (2013.01); *H04L 45/16* (2013.01)

(56) References Cited

U.S. PATENT DOCUMENTS

| | | | | |
|---|---|---|---|---|
| 2003/0169736 | A1* | 9/2003 | Lavigne | H04L 49/354 370/392 |
| 2008/0002570 | A1* | 1/2008 | Kurokawa | H04L 12/462 370/219 |
| 2008/0186981 | A1* | 8/2008 | Seto | H04L 12/4641 370/395.53 |
| 2010/0020809 | A1* | 1/2010 | Jones | H04L 12/42 370/395.53 |
| 2010/0080233 | A1* | 4/2010 | Kwapniewski | H04L 45/02 370/395.31 |
| 2011/0075680 | A1* | 3/2011 | Sun | H04L 45/00 370/419 |
| 2013/0033993 | A1 | 2/2013 | Cardona et al. | |
| 2013/0034094 | A1 | 2/2013 | Cardona et al. | |
| 2013/0034109 | A1 | 2/2013 | Cardona et al. | |
| 2013/0042238 | A1 | 2/2013 | Cardona et al. | |
| 2013/0044629 | A1 | 2/2013 | Biswas et al. | |
| 2013/0107889 | A1 | 5/2013 | Barabash et al. | |
| 2013/0272133 | A1* | 10/2013 | Yalagandula | H04L 41/0893 370/238 |
| 2014/0007230 | A1* | 1/2014 | Jani | G06F 21/00 726/22 |
| 2014/0241353 | A1* | 8/2014 | Zhang | H04L 45/74 370/390 |
| 2015/0180776 | A1* | 6/2015 | DeCusatis | H04L 12/4641 370/392 |
| 2015/0244617 | A1* | 8/2015 | Nakil | H04L 45/70 709/224 |

OTHER PUBLICATIONS

Lewin-Eytan, Liane, "Designing Modular Overlay Solutions for Network Virtualization", IBM Research Division, Aug. 28, 2011, 8 pages.
Louati, Wajdi, "Virtual Router Concept for Communications Between Personal Networks", Institut National des Telecommunications, France, 2005, 6 pages.

* cited by examiner

| GROUP POLICY 160 | | | | |
|---|---|---|---|---|
| GROUP ID'S 202 | | UNICAST 204 | | MULTICAST 206 |
| 101 | 102 | ALLOWED | | ALLOWED |
| 101 | 103 | NOT ALLOWED | | ALLOWED |
| 102 | 103 | ALLOWED | | NOT ALLOWED |

210 ↗ (row 1), 212 ↗ (row 2), 214 ↗ (row 3)

*FIG. 2*

| ENDPOINT ADDRESS AND GROUP RESOLUTION REQUEST 502 |||||
|---|---|---|---|---|
| SEQUENCE NUMBER 504 | REQUEST TYPE 506 | VIRTUAL SWITCH ID 508 | SOURCE VIRTUAL IP ADDRESS 510 | DESTINATION VIRTUAL IP ADDRESS 512 |

| OVERLAY ADDRESS AND GROUP RESOLUTION REQUEST 514 ||||||
|---|---|---|---|---|---|
| ENCODING HEADER 516 | SEQUENCE NUMBER | REQUEST TYPE | SOURCE HOST ADDRESS 518 | SOURCE VIRTUAL IP ADDRESS | DESTINATION VIRTUAL IP ADDRESS |

| OVERLAY ADDRESS AND GROUP RESOLUTION RESPONSE 520 |||||
|---|---|---|---|---|
| ENCODING HEADER | SEQUENCE NUMBER | REQUEST TYPE | PHYSICAL ADDRESSES 522 | VG ID 524 |

| ENDPOINT ADDRESS AND GROUP RESOLUTION RESPONSE 530 |||||
|---|---|---|---|---|
| SEQUENCE NUMBER | REQUEST TYPE | VIRTUAL SWITCH ID | PHYSICAL ADDRESSES | VG ID |

FIG. 5

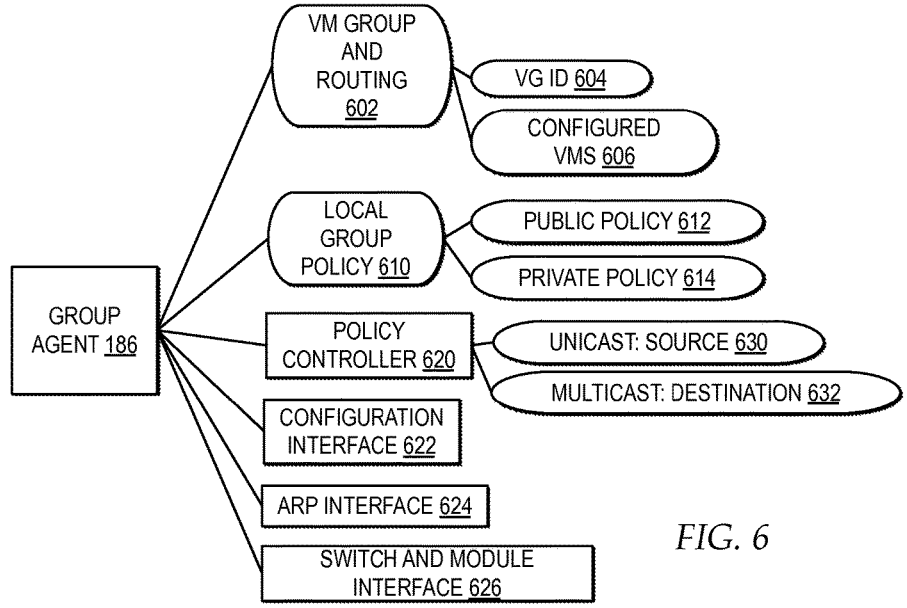

FIG. 6

VIRTUAL GROUP POLICY BASED FILTERING WITHIN AN OVERLAY NETWORK

BACKGROUND

1. Technical Field

This invention relates in general to managing an overlay network environment and more particularly to virtual group based filtering within an overlay network.

2. Description of the Related Art

Many users and entities operate computer networks that interconnect numerous computing systems to support their operations. In many systems, in order to manage numerous computing resources and share the numerous computer resources between multiple users, virtualization technologies are implemented. Server virtualization technologies enable a single physical server system, or host, to host multiple virtual machines (VMs), and enable a system administrator to move a VM from one physical server system to another physical server system. Some virtualization technologies enable a physical server to be shared among multiple users by providing each user with access to one or more of the VMs hosted by the same single physical server, with each VM operating as a software implementation of a machine, or computer, that executes programs like a physical machine with application separation and security, whether as a system virtual machine which supports execution of an operating system or a process virtual machine that runs as a normal application inside a host OS and supports a single process.

In addition to virtualization technologies providing virtualization of physical servers, virtualization technologies provide virtualization of network layers that provide communication links to hosts through a virtualized network layer referred to as an overlay network. From the perspective of a host, an overlay network presents a single layer 2, data link layer, or layer 3, network layer, network with no boundaries. In an overlay network, logical functions of the network are separated from the underlying physical infrastructure. An overlay network is created on top of one or more existing networks by generating logical communication links between hosts through the underlying physical network infrastructure. Logical communication links are created by tunneling, where a logical tunnel is created between hosts by one host receiving a data packet from a virtual machine on the host, encapsulating the data packet with tunnel headers that specify the addressing and control information required for transferring the data packet through multiple layers over the tunnel through the underlying physical network infrastructure to the target host, where the target host decapsulates the tunnel headers from the data packet and forwards the data packet to the target VM hosted by the target host.

BRIEF SUMMARY

Within an overlay network environment, one or more policies may need to be applied to filter the data packets passed between the virtual machines connected through the overlay network environment to control which virtual machines may communicate with one another. In addition, virtual machines may be grouped together in virtual groups and one or more policies may need to be applied to filter the data packets passed between the virtual machines by controlling which virtual machines in a virtual group may communicate with virtual machines in another group based on group policies. In view of the foregoing, there is a need for a method, system, and program product for managing data packet filtering according to virtual group policies in an overlay network environment.

In one embodiment, a method for managing packet filtering in an overlay network is directed to receiving a data packet at a virtual switch connected to at least one virtual machine of a plurality of virtual machines communicatively connected through an overlay network, each of the plurality of virtual machines configured within a separate one of a plurality of virtual groups in the overlay network, the data packet comprising a packet header comprising at least one address. The method is directed to receiving, by the virtual switch, a virtual group identifier for the at least one address from at least one address resolution service returning the virtual group identifier and a resolved address for the at least one address, in response to an address resolution request for the at least one address. The method is directed to forwarding the data packet through the virtual switch to the resolved address only if the virtual group identifier is allowed according to a filtering policy applied by the virtual switch for a particular virtual group identified by the virtual group identifier of the plurality of virtual groups.

In another embodiment, a system for managing packet filtering in an overlay network comprises one or more processors and a memory coupled to at least one of the processors. The system comprises a set of computer program instructions stored in the memory and executed by at least one of the processors in order to perform actions of receiving a data packet at a virtual switch connected to at least one virtual machine of a plurality of virtual machines communicatively connected through an overlay network, each of the plurality of virtual machines configured within a separate one of a plurality of virtual groups in the overlay network, the data packet comprising a packet header comprising at least one address. The system comprises a set of computer program instructions stored in the memory and executed by at least one of the processors in order to perform actions of receiving, by the virtual switch, a virtual group identifier for the at least one address from at least one address resolution service returning the virtual group identifier and a resolved address for the at least one address, in response to an address resolution request for the at least one address. The system comprises a set of computer program instructions stored in the memory and executed by at least one of the processors in order to perform actions of sending the data packet through the virtual switch to the resolved address only if the virtual group identifier is allowed according to a filtering policy applied by the virtual switch for a particular virtual group identified by the virtual group identifier of the plurality of virtual groups.

In another embodiment, a computer program product for managing packet filtering in an overlay network comprises a computer readable storage medium having program code embodied therewith, the program code executable by a computer system to receive, by a computer system, a data packet at a virtual switch connected to at least one virtual machine of a plurality of virtual machines communicatively connected through an overlay network, each of the plurality of virtual machines configured within a separate one of a plurality of virtual groups in the overlay network, the data packet comprising a packet header comprising at least one address. The program code executable by a computer system to receive, by the computer system, at the virtual switch, a virtual group identifier for the at least one address from at least one address resolution service returning the virtual group identifier and a resolved address for the at least one address, in response to an address resolution request for the at least one address. The program code executable by a computer system to send, by the computer system, the data packet through the virtual switch to the resolved address only if the virtual group identifier is allowed according to a filtering policy applied by the virtual switch for a particular virtual group identified by the virtual group identifier of the plurality of virtual groups.

BRIEF DESCRIPTION OF THE SEVERAL VIEWS OF THE DRAWINGS

The novel features believed characteristic of one or more embodiments of the invention are set forth in the appended claims. The one or more embodiments of the invention itself however, will best be understood by reference to the following detailed description of an illustrative embodiment when read in conjunction with the accompanying drawings, wherein:

FIG. 2 is a block diagram illustrating one example of a group policy for specifying which virtual groups may communicate with one another according to type of data packet transmission or other factors;

FIG. 5 is a block diagram illustrating one example of the endpoint address and group resolution request, overlay address and group resolution request, overlay address and group resolution response, and endpoint address and group resolution response data packets that may be passed between virtual switches, address and group resolution modules and distributed policy services within an overlay network environment to resolve the physical addresses and VG ID associated with a virtual IP address;

FIG. 6 is a block diagram illustrating one example of components of a group agent implemented within one or more of a virtual switch and a local module of an overlay interface of a host;

DETAILED DESCRIPTION

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

In addition, in the following description, for purposes of explanation, numerous systems are described. It is important to note, and it will be apparent to one skilled in the art, that the present invention may execute in a variety of systems, including a variety of computer systems and electronic devices operating any number of different types of operating systems.

Figure 1:
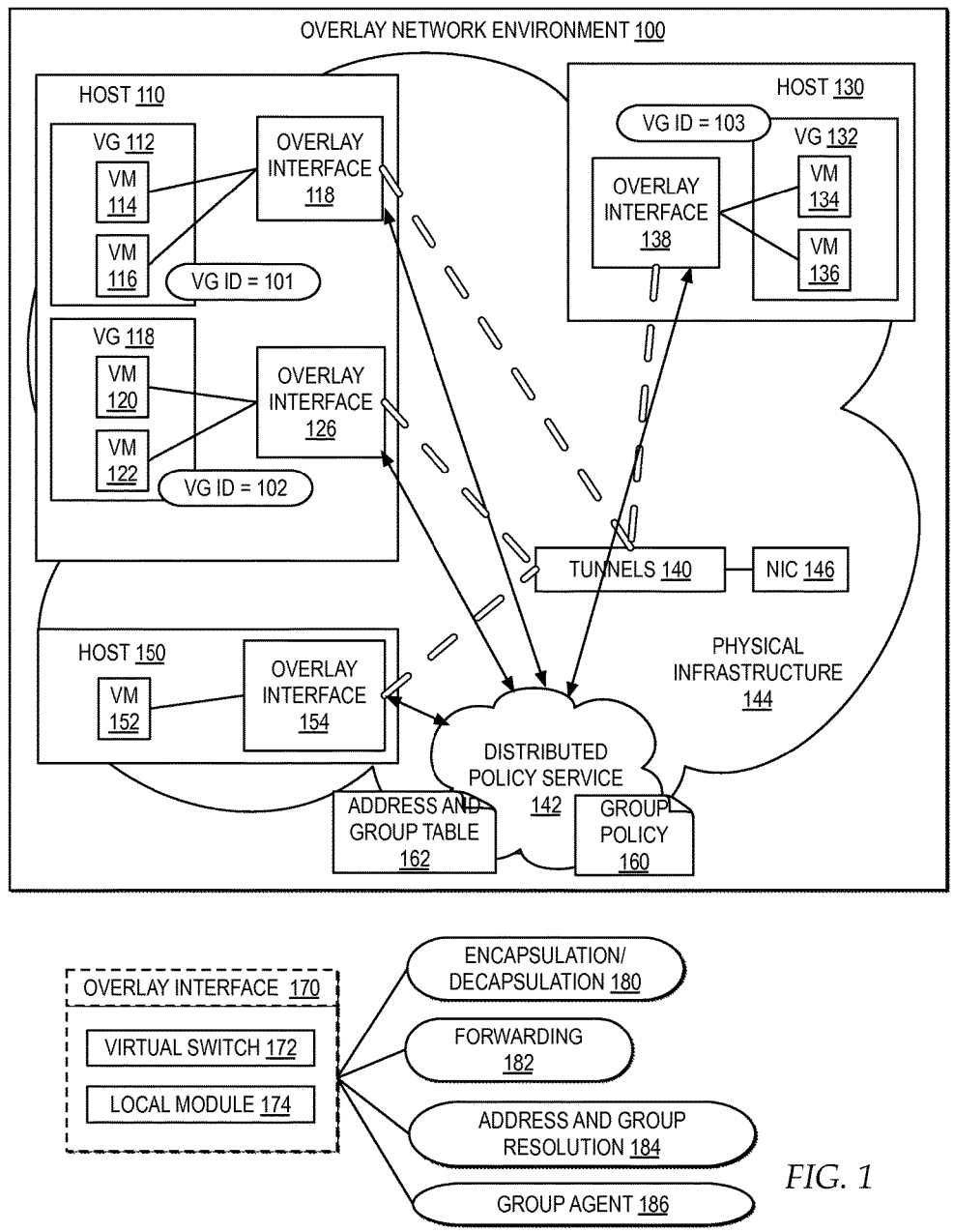
FIG. 1 is a block diagram illustrating one example of an overlay network environment that supports virtual group based data packet filtering.

With reference now to the figures, and in particular with reference now to FIG. 1, a block diagram illustrates one example of an overlay network environment that supports virtual group based data packet filtering.

In the example, an overlay network environment 100 may include one or more host systems, such as host 110, host 130, and host 150, communicatively connected through one or more network layers within overlay network environment 100 over a shared physical infrastructure 144. In one example, each of host 110, host 130, and host 150 may represent one or more physical resources, upon which a virtualization layer is hosted, with one or more virtualized resources of each of host 110, host 130, and host 150 represented as one or more VMs. Each VM represents a software implementation of a machine that executes programs like a machine, through one or more of hardware virtualization and software virtualization. In one example, host 110 hosts a VM 114, a VM 116, a VM 120, and a VM 122, host 130 hosts a VM 134 and a VM 136, and host 150 hosts a VM 152. In one example, each of host 110, host 130, and host 150 may be referred to as a host because it represents a computer system upon which runs one or more virtualization layers including, but not limited to, one or more hypervisor layers, where a hypervisor layer is software, hardware, or firmware that creates and runs virtual machines, referred to as a guest machines. In the example, a system administrator, or a host through a hypervisor or other controller, may dynamically adjust the resources allocated to a particular VM, may move a VM from one set of resources to another set of resources, may migrate a VM from one host to another host, may access additional resources and allocate the additional resources to a VM, and may perform additional or alternate types of VM management.

In the example, each VM may be referenced by a virtual IP address, where an IP address may represent a network layer address in an OSI layer 2 or OSI layer 3, where each IP address correlates with a link layer address in an OSI layer 1, for example. When changes are made to a VM, the host of the VM may update tables in one or more locations within overlay network environment 100 to specify one or more of the underlying network address and link layer address associated with a virtual IP address assigned to the VM. For example, an address and group table 162 may maintain a central table that includes the correlation between the logical addresses and physical infrastructure within overlay network environment 100, including the physical location of virtual machines. In addition, other virtual components within overlay network environment 100 may be assigned virtual addresses, which are stored in lookup tables with addresses for one or more of the layers on which the virtual component operates.

In the example, shared physical infrastructure 144 may represent the physical layer of a network infrastructure, including OSI layer 1, and may also include one or more of OSI layer 2, OSI layer 3, other OSI layers, and one or more virtual network layers. In the example, within overlay network environment 100, each of host 110, host 130, and host 150 may view shared physical infrastructure 144 as a single OSI layer 2 or OSI layer 3 network and establish endpoint-to-endpoint connectivity for each of the VMs on each of the hosts through one or more types of overlay interfaces operated on each host. Each overlay interface provides an interface between one or more VMs and physical infrastructure 144, to provide connectivity to another VM, by providing one or more interfaces and functional components for performing address resolution and policy application, for encapsulating data packets with tunnel headers defining the physical pathways through physical infrastructure 144 to a target host through tunnels 140, for delivering data using tunneling protocols, for decapsulating the encapsulated data packets received from a source host, and for forwarding data packets to one or more target VMs within a host. In the example, tunnels 140 refer to the collective of logical tunnels, each representing a pathway between two hosts through one or more network appliances, within physical infrastructure 144. In the example, for providing endpoint to endpoint connectivity between VMs within overlay network environment, an overlay interface 118 provides an interface for VM 114 and VM 116, an overlay interface 126 provides an interface for VM 120 and VM 122, an overlay interface 138 provides an interface for VM 134 and VM 136, and an overlay interface 154 provides an interface for VM 152.

In the example, a distributed policy service 142 may represent a control plane engine that interfaces with each of overlay interface 118, overlay interface 126, overlay interface 138, and overlay interface 154 to maintain address and group table 162 which may include a logical view of overlay network environment 100 and a correlation between the logical view physical infrastructure 144, including the physical location of virtual machines, locations of network appliances, and locations of virtual and physical machines within overlay network environment 100. Distributed policy service 142 may distribute the information maintained in address and group table 162 to each of the overlay interfaces and the overlay interfaces may maintain local copies of the overlay network information received from distributed policy service 142.

In one example, an overlay interface 170 illustrates examples of virtual layers and functions that may be implemented in and performed by overlay interface 118, overlay interface 126, overlay interface 138, and overlay interface 154. In the example, overlay interface 170 may include one or more virtual switches, such as virtual switch 172, and one or more local modules, such as local module 174. Virtual switch 172 and local module 164 may separately or in combination perform functions including, but not limited to, managing address and group resolution through address and group resolution 184, managing encapsulation of data packets with tunnel headers specifying one or more layers of a network pathway within tunnels 140 and passing a data packet to another host using a tunneling protocol and decapsulation of encapsulated data packets received from tunnels 140 through encapsulation/decapsulation 180, and forwarding of data packets to one or more target VMs on a host through forwarding 182. In addition, overlay interface 170 may implement a group agent 186 for managing virtual group identification and configuration and managing virtual group policies. In one example, virtual switch 172 may be a virtual representation of an Ethernet switch or other physical switch and run within the hypervisor layer of the host. In the example, policy rules may be managed by virtual switch 172 using iptables/ebtables rules, Open VSwitch rules, or one or more other types of network-based policy rules for determining, at a virtual switch, or other type of bridge, whether to allowing routing of a data packet to a target and the routing to use if routing the data packet to a target, whether through encapsulation/decapsulation 180 or forwarding 182. While in the example illustrated overlay interface 118 is illustrated as an interface independent from overlay interface 126, in other embodiments, a host with multiple overlay interfaces may include a separate virtual switch in each of the multiple overlay interfaces and a shared local module across the multiple overlay interfaces.

In one example, overlay network environment 100 may implement one or more types of network virtualization technology and protocols for defining and performing encapsulation/decapsulation 180, forwarding 182, address and group resolution 184, group agent 186, and other network virtualization functions performed by the overlay interfaces between one or more hosts and physical infrastructure 144, including, but not limited to Virtual Extensible Local Area Network (VxLAN), Network Virtualization using Generic Routing Encapsulation (NVGRE), and Distributed Overlay Virtual Ethernet (DOVE). In one example, VxLAN is a network virtualization technology that encapsulates media access control address (MAC)-based Open Systems Interconnect (OSI) layer 2 Ethernet frames within layer 3 User Datagram Protocol (UDP) packets. In one example, NVGRE is a network virtualization technology that uses Generic Routing Encapsulation (GRE), a tunneling protocol the may encapsulate a wide variety of network layer protocols inside virtual point to point links over an Internet Protocol internetwork, to tunnel layer 2 packets over layer 3 networks. In one example, DOVE is a tunneling and virtualization technology for computer networks that facilitates the creation of virtualization layers for deploying, controlling, and managing multiple independent and isolated network applications between one or more host systems over shared physical infrastructure 144. In one example, DOVE implements virtual switches within overlay interfaces as DOVE switches or d-Switches that perform encapsulation of layer 2 frames into UDP packets and provide virtual interfaces for virtual machines to plug into. In one example, DOVE switches may run as part of a hypervisor layer for virtual machines on a host, rather than within an Ethernet switch physically connected to the host, such that virtual machine addresses are not present in the Ethernet switches, thereby reducing the MAC table size.

In the example, in particular, VMs within overlay network environment 100 may specify the source address of a data packet using the virtual IP address of the source VM and specify the destination address for a data packet using a virtual IP address of the destination VM. To provide connectivity between the VMs across physical infrastructure 144 within overlay network environment 100, each overlay interface may implement address and group resolution 184 to resolve the physical addresses associated with a virtual IP address in a data packet and identify policies and physical path translations for providing connectivity between each of the VMs based on resolved physical addresses. Within overlay network environment 100, when a source VM sends data to one or more destination VMs, overlay network environment 100 includes policy corresponding to the hosts that describes a logical path on which the data travels through one or more network layers between hosts through tunnels 140 within physical infrastructure 144, where encapsulation/decapsulation 180 identifies the logical path in a tunnel header and sends the data packet through a logical tunnel defined in the header using a tunnel protocol. When a destination overlay interface receives a data packet, the destination overlay interface identifies one or more paths through a switch on the host for forwarding a data packet to one or more VMs by forwarding 182.

In the example, overlay network environment 100 may provide policies and physical path translations for managing endpoint-to-endpoint connectivity for both unicast data packets from a source VM to a destination VM and for multicast data packets from a single source VM to multiple destination VMs. In the example of a multicast data packet, the data packet may be sent by a VM to a multicast IP address, where overlay network environment 110 supports one or more types of multicast, including, but not limited to, broadcast, at one or more of the overlay interface layer and at the physical infrastructure layer, such as through NIC 146, by duplicating the packet and sending a copy of the data packet over all of the tunnels within tunnels 140 with the goal of delivering a copy to every host for distribution to all the VMs, or network endpoints, according to filtering policies. When a VM multicasts a data packet within overlay network environment 100, the VM effectively addresses the data packet to all or a subset of VMs or endpoints within overlay network environment 100, without needing to know the location or existence of the other VMs or endpoints. As described herein, broadcast is a type of multicast, and where the term multicast is used, multicast, or other types of multicast, such as broadcast, may also be implemented.

Policies applied within overlay network environment 100 may define quality of service (QoS) requirements between a set of virtual machines, or a set of virtual or physical appliances within physical infrastructure 144 to traverse when sending or receiving data. In addition, a policy may be configured to disallow communication between the source virtual machine and the destination virtual machine. In the example, VMs may be further configured into virtual groups (VGs), and policies may be configured to disallow communication between the source virtual machine and the destination virtual machine according to VG to which each VM is configured.

In one example, each overlay interface within overlay network environment 100 may perform address and group resolution 184 by consulting a local address and group table maintained by the overlay interface for entries stored for the virtual IP addresses, by sending an address and group resolution request to distributed policy service 142 that maintains an address and group table 162 with physical addresses and VG IDs associated with virtual IP addresses, or by sending an address resolution protocol (ARP) request to a specific IP multicast address that is joined by all tunnel endpoints to all the hosts within overlay network environment, through multicast-enabled network interface controller (NIC) 146, and collecting ARP responses from any hosts that return an ARP response, where an ARP response may include one or more physical addresses associated with a virtual IP address and may also include a VG ID associated with a virtual IP address.

In particular, in the example, one or more of overlay interface 118, overlay interface 126, overlay interface 138, and overlay interface 154 may communicate with distributed policy service 142 implemented within a layer of overlay network environment 100. In the example illustrated, distributed policy service 142 may be accessible through physical infrastructure 144 or supported within overlay network environment 100 by an infrastructure separate from physical infrastructure 144. In one example, distributed policy service 142 may represent a kernel-based VM (KVM) guest, a container, a daemon, or other components that runs an agent that resolves address and group resolution requests against address and group table 162 and maintains address and group table 162.

In the example, distributed policy service 142 maintains an address and group table 162 that provides a central database for managing a logical view of overall network environment and a table of virtual IP addresses associated with physical addresses and/or policies and physical path translations within overlay network environment 100, that also includes the group identifier configurations for the virtual IP address of each VM configured in a virtual group within overlay network environment 100. In one example, distributed policy service 142 may periodically send ARP requests within overlay network environment 100 to collect current addressing within overlay network environment. In one example, group agent 186 is enabled in each overlay interface to add any virtual group identifier information configured for a host to the ARP response with the physical addresses traditionally returned in an ARP response. In one example, each of overlay interface 118, overlay interface 126, overlay interface 138, and overlay interface 154 may submit configuration information about VMs and VGs on each of the hosts to distributed policy service 142 for placement in address and group table 162 and, as any configuration changes are made within hosts within overlay network environment 100, the overlay interface for the host may submit configuration updates to distributed policy server 142 to update in address and group table 162. In addition, system administrators and other management modules implemented within overlay network environment 100 may update address and group table 162.

Overlay interface 118, overlay interface 126, overlay interface 138, and overlay interface 154 may submit address and group resolution requests for virtual addresses to distributed policy service 142, distributed policy service 142 may resolve a physical path translation and VG identifier for connectivity between two virtual addresses from address and group table 162, and distributed policy service 142 may return the resolved result to the requesting overlay interface. Each of overlay interface 118, overlay interface 126, overlay interface 138, and overlay interface 154 may also store resolved results in a local table and may attempt to first resolve address and group resolution requests against a local table before sending the request to distributed policy service 142.

In one example, VMs within overlay network environment 100 may be configured into virtual groups (VGs), where all the VMs configured into a same VG are connected to a same virtual switch or bridge within an overlay interface and where each VG is identified by a VG identifier (ID). In the example, group agent 186 within an overlay interface may maintain the VG ID and addresses for the VMs configured in the VG. In the example, VM 114 and VM 116 are in a VG 112 with a VG ID of "101" configured on a virtual switch of overlay interface 118, VM 120 and VM 122 are in a VG 118 with a VG ID of "102" configured on a virtual switch of overlay interface 126, and VM 134 and VM 138 are in a VG 132 with a VG ID of "103" configured on a virtual switch of overlay interface 138. In the example, while host 150 hosts a VM 152 that has connectivity with other hosts within overlay network environment through overlay interface 154, VM 152 is not configured within a virtual group. As illustrated, multiple virtual groups may be configured on a single host and a host may include VMs that are not configured in a virtual group.

In the example, overlay network environment 100 may support virtual group based filtering of packets throughout overlay network environment 100 by resolving, at the overlay interface level, virtual group identifiers for virtual IP addresses identified in data packets and applying, at the overlay interface level, virtual group policies to data packets to determine whether to allow a data packet through a virtual switch to a destination address. In the example, as previously described, each overlay interface may resolve the virtual group identifier associated with a particular virtual IP address for a data packet when performing resolution of the connectivity path between virtual IP addresses of VMs through address and group resolution 184, whether through a local table maintained by the overlay interface, by requesting resolution from distributed policy service 142, which maintains VG identifiers configured with virtual IP addresses in address and group table 162, or through an encapsulated ARP request sent to a multicast IP address within overlay network environment 100, where each virtual switch 172 receiving the ARP request and supported by group agent 186 may return a VG ID associated with the virtual switch with an ARP response. While in the example illustrated and other examples described herein, with regard to resolution of addresses and discovery of the current node addressing within the system, the ARP requests described may be implemented by Internet Protocol version 4 (IPv4) and other protocols. In additional or alternate embodiments, other protocols, such as Internet Protocol version 6 (IPv6), may perform similar types of requests for resolution of addresses and discovery of the current node addressing within the system through IPv6 neighbor discovery or other address resolution methods. For example, within IPv6, ARP requests are replaced by neighbor discovery requests which are sent to a multicast IP, thus within IPv6, a request for address resolution is implemented through an encapsulated multicast neighbor discovery request sent to a multicast IP address.

In the example, distributed policy service 142 may maintain a group policy 160, within address and group table 162 or as a separate component from address and group table, where group policy 160 specifies policies, by VG ID, for disallowing communications between VGs. Group policy 160 may further specify policies for disallowing communications between VGs based on the type of communication or other factors specified in the policy. In the example, each of overlay interface 118, overlay interface 126, overlay interface 138, and overlay interface 154 may locally store group policy 160 or may access group policy 160 from distributed policy service 142 or another agent. In addition, each overlay interface may store a local group policy that is not distributed within group policy 160. Group agent 186 may manage the collection of group policy 160 from distributed policy service 142 for a particular overlay interface, may manage an interface for a user to specify a public group policy for a VG to add to group policy 160 and a private group policy for a VG not to share as group policy 160, and manage local storage of any private group policies set for a VG and any public group policies set in group policy 160. In the example, if a VM is not configured in a VG, then group policy 160 may be set to automatically disallow communications between VMs that are configured in VGs and VMs that are not configured in VGs.

In the example, each of overlay interface 118, overlay interface 126, overlay interface 138, and overlay interface 154 may apply group policy 160 to filter unicast data packets received from a source VM on a host before allowing transmission from the host through tunnels 140 to a destination VM. For example, if overlay interface 118 receives a unicast data packet from VM 114, intended for a destination VM 134, overlay interface 118 resolves the connectivity addressing between 114 and VM 134, and with the resolution of the virtual IP address of VM 134 retrieves the group identifier configured for destination VM 134 of VG ID "103", and determines whether the group policies allow for unicast data packets between VG ID "101" for the source VM and VG ID "103" for the destination VM, before allowing encapsulation of the data packet for sending through tunnels 140 to host 130 by encapsulation/decapsulation 180. By filtering unicast data packets according to group policy 160 at the source overlay interface, when a destination overlay interface receives a unicast data packet, the destination overlay interface may assume that the data packet has already been filtered by group policy 160 and that the destination VM is allowed to receive the data packet according to group policy 160.

In the example, each of overlay interface 118, overlay interface 126, overlay interface 138, and overlay interface 154 may apply group policy 160 to filter multicast data packets received from tunnels 140 at a host before forwarding multicast data packets to one or more destination VMs on the host. In the example, and throughout the description, multicast data packets may include broadcast data packets. In one example, if overlay interface 138 receives a multicast data packet from VM 116, overlay interface 138 is a destination overlay interface which resolves, through address and group resolution 184, the group identifier configured for source VM 116 of VG ID "101", and determines whether the group policies allow for multicast data packets between VG ID "101" and VG ID "103", before allowing the data packet through a virtual switch to VM 134 and VM 136 by forwarding 182. By filtering multicast data packets according to group policy 160 at the destination overlay interface, a VM may select to multicast a data packet by calling an multicast IP address and the IP, UDP, and other multicast infrastructure supported within overlay network environment 100 across one or more network layers to efficiently distribute a data packet to only a selection of the multiple hosts within overlay network environment 100, but without having to send separate unicast data packets to each of the selection of the multiple hosts, because virtual group based policy filtering is performed by each of the overlay interfaces of each host receiving a multicast data packet, where each overlay interface determines whether the VG ID for the source VM is allowed to communicate with the VG configured to the destination overlay interface. In contrast, if the source overlay interface attempted to filter multicast data packets according to group policies, in an example where an overlay network environment includes thousands of hosts, the source overlay interface would have to perform the computations to separately filter the multicast data packet for each of the thousands of hosts and then to encapsulate a separate unicast packet for the selection of hosts with VMs in VGs allowed to communicate with the VG of the source VM, requiring a significant amount of computational and network resources for the source overlay interface to support one or more types of data packet multicasting, including data packet broadcasting. In the example, NIC 146 or other controllers within overlay network environment 100 may support multiple ranges of multicast IP addresses, where one multicast IP address may trigger packet distribution to all hosts within overlay network environment 100 and where other multicast IP addresses may trigger packet distribution to only a range or domain of hosts within overlay network environment 100.

In the example, by performing virtual group based filtering of data packets at the source host overlay interface level for unicast packets and at the destination host overlay interface for multicast packets, virtual group based filtering of data packets according to virtual group policies is supported without requiring transmission of a virtual group identifier in the data packet being filtered, which reduces data packet overhead and reduces the exposure of the virtual group identifier to unauthorized access or modification. While a data packet header could be modified to include a virtual group identifier of one or more of a source VM address and a destination VM address and group based packet filtering applied within overlay network environment 100 based on the virtual group ID in the packet header, transmission of a virtual group identifier within a data packet header requires additional overhead within the data packet header and additional overhead in the amount of data encapsulated and decapsulated in a tunnel header by encapsulation/decapsulation 180. In addition, while a data packet header could be modified to include a virtual group identifier of one or more of a source VM address and a destination VM address, if virtual group identifier configurations are included a data packet that is placed through tunnels 140 within physical infrastructure, while there may be security protocols in place to secure data packets through tunnels 140, the data packet is still placed on a shared network infrastructure where an unauthorized user snooping packets on physical infrastructure 144 could access the data packet within tunnels 140 and modify the virtual group identifier in the data packet header to thwart virtual group based policies or the snooping user could use the virtual group identifier in some other unauthorized manner to compromise the application of policy within overlay network environment 100.

In addition, in the example, by performing virtual group based filtering of data packets at the source host layer interface level for unicast packets and at the destination host overlay interface for multicast packets, as managed by group agent 186, any software updates required to the infrastructure supporting group policies may only require updating group agent 186 within each overlay interface 170. My minimizing the layers and components that are required for implementing virtual group based filtering of data packets, the overhead required to maintain these layers and components is also minimized.

In the example, while overlay interface 118, overlay interface 126, overlay interface 138 and overlay interface 154 are described as the layer in which virtual group based filtering of data is performed within overlay network environment 100, in additional or alternate embodiments, other interfaces, components, or layers of overlay network environment 100 enabled to resolve the virtual group identifier for a source VM and a destination VM based on a virtual address in a data packet and enabled to apply group policy 160 to manage the flow of data packets, may perform virtual group based filtering of data within overlay network environment 100. In one example, because overlay network environment 100 may support endpoint-to-endpoint connectivity between VMs supported through different types of virtualization software protocols on hosts and supported by hosts with resources configured in different types of network architectures, such as a host with resources configured through a cloud infrastructure and a host with resources configured through a cluster infrastructure, all connected through physical infrastructure 144, the interfaces and layers implemented by a host to support connectivity to other hosts within overlay network environment 100 through physical infrastructure 144 may include additional or alternate layers to the layers illustrated and the additional or alternate layers may perform virtual group based filtering of data.

FIG. 2 illustrates a blocked diagram of one example of a group policy for specifying which virtual groups may communicate with one another according to type of data packet transmission or other factors.

In the example, group policy 160 may include multiple entries, with each entry identifying a pairing of group identifiers (ID's) 202 and one or more factors for specifying whether communication is allowed. In one example, factors for specifying whether communication is allowed may include type of data packet transmission, such as unicast 204 for a unicast data packet transmission and multicast 206 for a multicast data packet transmission, including broadcast data packet transmission. Although a single entry is illustrated for each pairing of group identifiers, the allowance setting for each factor may be set by a same host system or administrator or by different hosts or administrators. In additional or alternate embodiments, additional or alternate elements may be specified for each entry within group policy 160 and the data illustrated within a single entry may be distributed throughout multiple entries. In addition, while the policies illustrated in group policy 160 specify whether a communication is allowed or not allowed, in other examples, the policies illustrated in group policy 160 may specify that a policy is unknown and needs to be set or may specify other types of policies to be applied for communications sent between each pairing of VGs.

In one example, an entry 210 specifies group IDs 202 of "101" and "102" and specifies a policy for unicast 204 of "allowed" and a policy for multicast 206 of "allowed". Referring back to FIG. 1, for example, VM 114 and VM 116 are configured within the VG with a VG ID of "101" and VM 120 and VM 122 are configured within the VG with a VG ID of "102". In one example, whether a data packet is unicast or multicast between any of VM 114, VM 116, VM 120, and VM 122, the data packet is filtered by overlay interface 118 or overlay interface 126 and the data packet is allowed through to the destination VMs.

In one example, an entry 212 specifies group IDs 202 of "101" and "103" and specifies a policy for unicast 204 of "not allowed" and a policy for multicast 206 of "allowed". In the example, referring to FIG. 1, VM 114 and VM 116 are configured within the VG with a VG ID of "101" and VM 134 and VM 136 are configured within the VG with the VG ID of "103".

In one example, an entry 214 specifies group IDs 202 of "102" and "103" and specifies a policy for unicast 204 of "allowed" and a policy for multicast 206 of "not allowed". In the example, referring to FIG. 1, VM 120 and VM 122 are configured within the VG with a VG ID of "102" and VM 134 and VM 136 are configured within the VG with the VG ID of "103".

In one example of the application of entry 212, if VM 114 unicasts a data packet to VM 134, with VM 134 identified in the data packet by a destination virtual IP address, overlay interface 118 would receive the data packet from VM 114, resolve the source virtual IP address and destination virtual IP address to determine addressing for one or more link layers for a tunnel between overlay interface 118 and overlay interface 138 of host 130, and with the resolved addressing for destination virtual IP address, receive a VG ID for the destination virtual IP address of "103". When overlay interface 118 accesses entry 212 for communications between VG ID "101" and VG ID "103" and determines, for a unicast type of data packet transmission, communication is "not allowed" between the virtual groups, overlay interface 118 drops the data packet from transmission, and may return an error message to VM 114 indicating that the data packet transmission was not allowed.

In another example of the application of entry 212, if VM 114 multicasts a data packet, overlay interface 138, among multiple overlay interfaces, would pick up a copy of the multicast data packet and resolve an address and group request for the source virtual IP address for VM 114 to resolve a virtual group identifier associated with the source virtual IP address, which is VG ID "101". When overlay interface 138 accesses entry 212 for communications between VG ID "101" and VG ID "103" and determines, for a multicast type of data packet transmission, communication is "allowed" between the virtual groups, overlay interface allows the data packet to be forwarded to each of VM 134 and VM 136.

In one example of the application of entry 214, if VM 134 unicast a data packet to VM 120 with VM 120 identified in the data packet by a destination virtual IP address, overlay interface 138 would receive the data packet from VM 134, resolve the source virtual IP address and destination virtual IP address to determine addressing for one or more link layers for a tunnel between overlay interface 138 and overlay interface 128 of host 110, and with the resolved addressing for destination virtual IP address, receive a VG ID for the destination virtual IP address of "102". The VG ID for VM 134 is VG ID "103". When overlay interface 138 accesses entry 214 for communications between VG ID "102" and VG ID "103" and determines, for a unicast type of data packet transmission, communication is "allowed" between the virtual groups, overlay interface 138 allows the data packet to be encapsulated and forwarded to host 110 through tunnels 140.

In another example of the application of entry 212 and 214, if VM 134 multicasts a data packet, overlay interface 118, overlay interface 126, and overlay interface 154, among multiple overlay interfaces, would pick up the multicast data packet off the multicast tunnel and resolve an address and group request for the source virtual IP address for VM 134 to resolve a virtual group identifier associated with the source virtual IP address, which is VG ID "103". When overlay interface 118 accesses entry 212 for communications between VG ID "101" and VG ID "103" and determines, for a multicast type of data packet transmission, communication is "allowed" between the virtual groups, overlay interface allows the data packet to be forwarded to each of VM 114 and VM 116. In contrast, when overlay interface 126 accesses entry 214 for communications between VG ID "102" and VG ID "103" and determines, for a multicast type of data packet transmission, communication is "not allowed" between the virtual groups, overlay interface drops the data packet. In the example, no VMs on host 150 are configured into a VG and overlay interface 154, upon receiving the multicast data packet, may be set to apply policies that are independent of the group identifier configured for the source virtual IP address of the source VM. However, in a contrasting example, if VM 152 were to multicast a data packet, any of overlay interface 118, overlay interface 126, and overlay interface 138, upon receiving the data packet and determining that the source virtual IP address for VM 152 is not configured in any virtual group, may all drop the multicast packets from VM 152 as a way to guard against data packets from VMs that are not configured into registered virtual groups. In the example, In the example, as illustrated, by applying virtual group based data packet filtering, while a VM may multicast a data packet to the multicast IP address for forwarding the data packet to each host within overlay network environment 100, the VG policy determines, for each selection of VMs configured in a VG, whether the VMs in a VG will receive the multicast data packet or not and may block all VMs which are not identified in any VG from receiving a multicast data packet.

Figure 3:
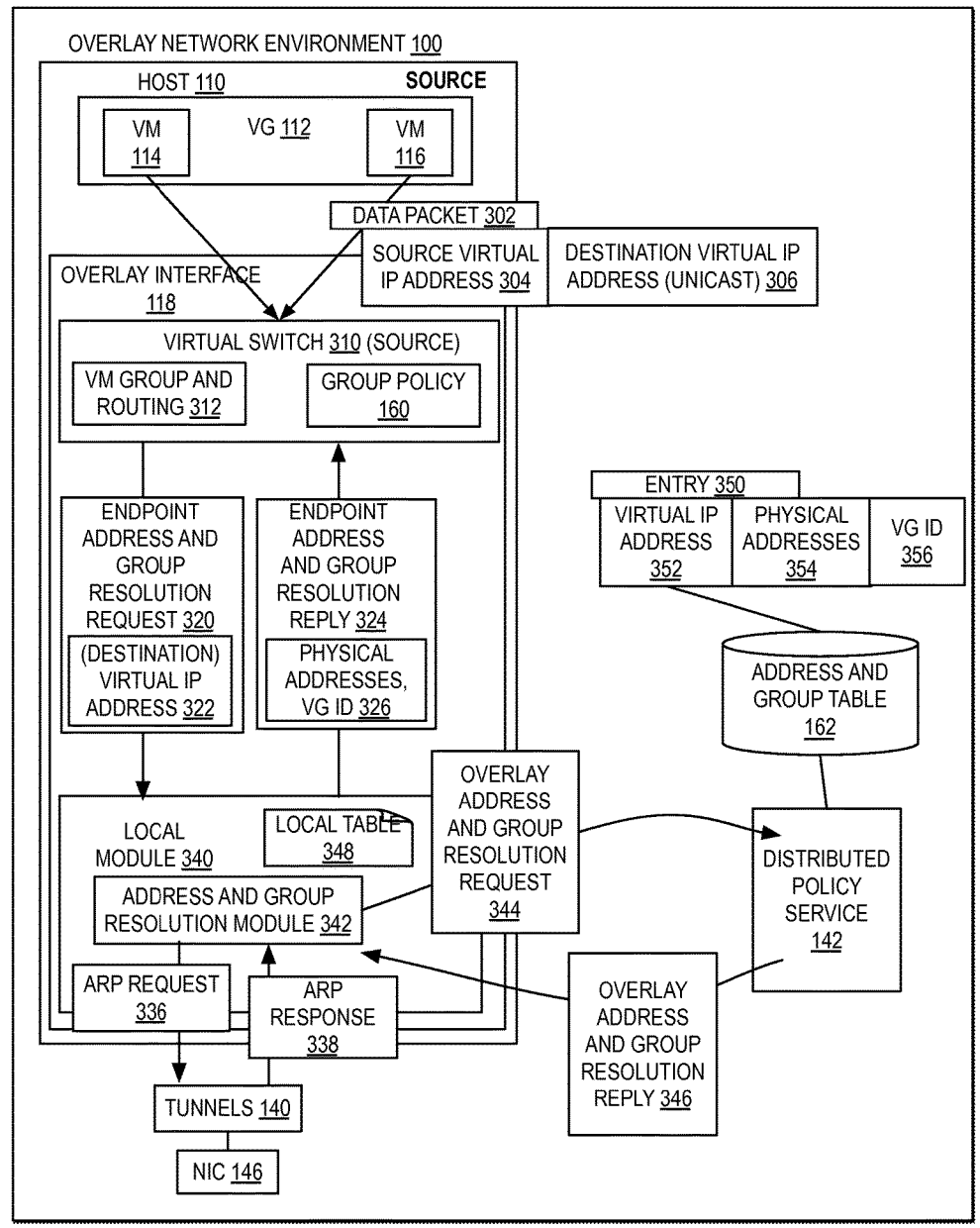
FIG. 3 is a block diagram illustrating an example of virtual group based packet filtering of a unicast data packet by a source overlay interface in an overlay network environment.

FIG. 3 illustrates a block diagram of an example of virtual group based packet filtering of a unicast data packet by a source overlay interface in an overlay network environment. In the example, overlay interface 118 of host 110 within overlay network environment 100 includes a virtual switch 310, which represents a virtual switch for providing a bridge for VM 114 and VM 116 and to facilitate endpoint-to-endpoint connectivity of VM 114 and VM 116 with other VMs, functioning as endpoints, within overlay network environment. In the example, VM 116 transmits a data packet 302, which may include, in a header, one or more of source virtual IP address 304 identifying the virtual IP address for VM 116 and a destination virtual IP address 306, set to a unicast address for a particular VM that is the target of the data packet. In the example, the header for data packet 302 may include additional or alternate information and may be specified in one or more protocols.

In the example, virtual switch 310 receives data packet 302 and reads destination virtual IP address 306. Virtual switch 310, responsive to determining that destination virtual IP address 306 is a unicast address, sends an endpoint address and group resolution request 320 to a local module 340 requesting resolution of virtual IP address 322 set to the value from destination virtual IP address 306. Local module 340 includes an address and group resolution module 342 that may respond to endpoint address and group resolution request 320 by checking a local table 348 of previously accessed addresses to determine whether the request may be resolved locally. In addition, address and group resolution module 342 may respond to endpoint address and group resolution request 320 by forwarding endpoint address and group resolution request 320 as an overlay address and group resolution request 344 to distributed policy service 142, receiving an overlay address and group resolution reply 346 from distributed policy service 142 with any physical addresses and VG ID's resolved for the destination virtual IP address by distributed policy service 142, and forwarding overlay address and group resolution reply 346 to virtual switch 310 as endpoint address and group resolution reply 324. In one example, address and group resolution module 342 may forward overlay address and group resolution request 344 to distributed policy service 142 by encapsulating endpoint address and group resolution request 320 with a tunnel header and forwarding the packet through tunnels 140 to distributed policy service 142. In the example, distributed policy service 142 may resolve overlay address and group resolution request 344 against one or more entries, such as entry 350, which includes a virtual IP address 352 assigned to one or more physical addresses 354, and a VG ID 356. In the example, physical addresses 354 may also include the physical path addressing for specifying the connectivity path between host 110 and the host of destination virtual IP address 306. In another example, local module 340 includes an address and group resolution module 342 that may respond to endpoint address and group resolution request 320 by encapsulating an ARP request 336 directed to a broadcast IP address for resolving virtual IP address 322 and sending the encapsulated ARP request to a multicast IP address via tunnels 140 to NIC 146 and receives one or more ARP response 338 with any physical addresses and VG ID's resolved for virtual IP address 322. Address and group resolution module 342 may compile ARP responses to identify a VG ID for virtual IP address 322. In the example, a virtual switch on one or more hosts reading the ARP request may respond to the ARP request to resolve the physical address and VG ID assigned to a virtual IP address based on VM addressing for VM 114 and VM 116 and a configured VG ID for VG 112 stored in VM group and routing 312.

In the example, address and group resolution module 342 returns the physical addresses and VG ID, if any, resolved for virtual IP address 322 to virtual switch 310 as physical addresses and a VG ID 326 in an endpoint address and group resolution reply 324. In the example, virtual switch 310 filters data packet 302 based on a particular group policy specified in group policy 160 for communications between the VG ID returned in endpoint address and group resolution reply 324 and the VG ID for VG 112. In the example, if the particular group policy specified in group policy 160 allows communication between the identified VGs for a unicast communication, then virtual switch 310 may route data packet 302 to local module 340 for encapsulation with tunnel headers based on the physical addresses for a logical tunnel through tunnels 140 to a host of the VM specified as the target endpoint in destination virtual IP address 306. In the example, if the particular group policy specified in group policy 160 does not allows communication between the identified VGs for a unicast communication, then virtual switch 310 drops data packet 302 and, if virtual switch 310 includes an error protocol, may trigger an error through the error protocol.

In the example, for local module 340 to encapsulate data packet 302 for transmission through tunnels 140, local module 340 has to resolve a connectivity path between host 110 and the host of virtual IP address 322, therefore adding VG ID resolution to the address resolution for destination virtual IP addresses already performed by local module 340 for a unicast address, adds minimal overhead to the address resolution process and enables virtual group based packet filtering within an overlay network environment 100 without requiring VG ID to be identified in the packet header of the data packet to be filtered. In the example, the physical addresses resolved for a virtual IP address may include one or more addresses specifying the location and physical pathway between host 110 and a host of the destination virtual IP address, which may include link layer, network layer, and other layer addresses, in addition to the physical address of the current host of the destination virtual IP address.

Figure 4:
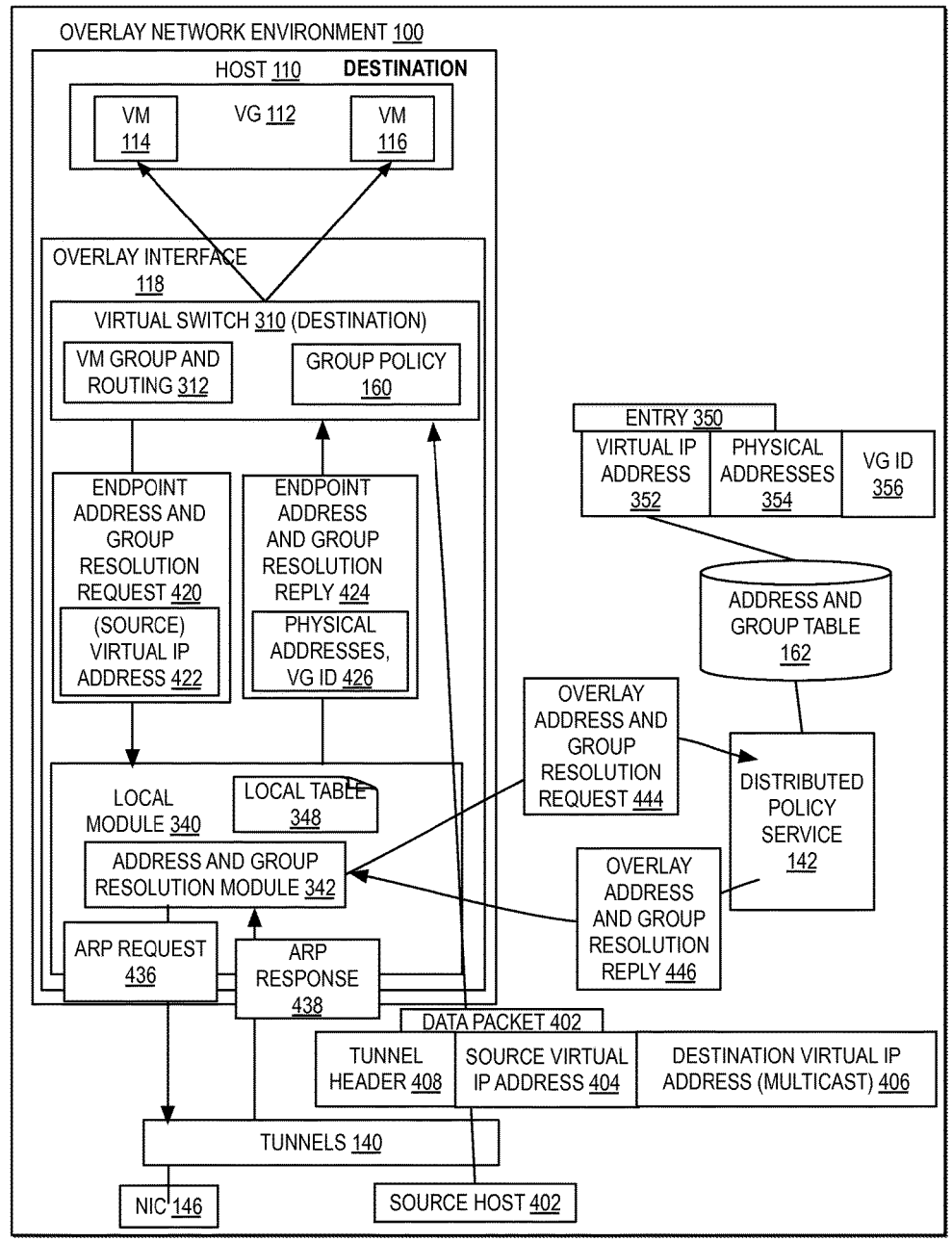
FIG. 4 is a block diagram illustrating an example of virtual group based packet filtering of a multicast data packet by a destination overlay interface in an overlay network environment.

FIG. 4 illustrates a block diagram of an example of virtual group based packet filtering of a multicast data packet by a destination overlay interface in an overlay network environment. While in the example in FIG. 3, overlay interface 118 represents the source overlay interface for sending data packet 302 from VM 116 to a destination address, in FIG. 4, overlay interface 118 represents a destination overlay interface for receiving a data packet 402 multicast by a source host 402 to one or more hosts within overlay network environment 100. In the example, data packet 402 includes a source virtual IP address 404 of a VM on source host 402 that sent the data packet and a destination virtual IP address 406, indicating data packet 402 is a multicast data packet. In the example, the header for data packet 302 may include additional or alternate information and may be specified in one or more protocols.

In the example, overlay interface 118 may pick up or receive data packet 402 from tunnels 140, where data packet 402 is encapsulated with tunnel header 408. In one example, overlay interface 118 may decapsulate data packet 402 to remove tunnel header 408 and access source virtual IP address 404 and destination virtual IP address 406 for the packet header. Virtual switch 310 reads destination virtual IP address 406 and determines that the destination IP address is a multicast address. Virtual switch 310, responsive to determining that destination virtual IP address 306 is a multicast address, sends an endpoint address and group resolution request 420 to local module 440 requesting resolution of virtual IP address 422 set to the value from source virtual IP address 404. Local module 340 includes an address and group resolution module 342 that may respond to endpoint address and group resolution request 420 by checking local table 348 of previously accessed addresses to determine whether the request may be resolved locally. In addition, address and group resolution module 342 may respond to endpoint address and group resolution request 420 by forwarding endpoint address and group resolution request 420 as an overlay address and group resolution request 444 to distributed policy service 142, receiving an overlay address and group resolution reply 446 from distributed policy service 142 with any physical addresses and VG ID's resolved for the source virtual IP address by distributed policy service 142, and forwarding overlay address and group resolution reply 446 to virtual switch 310 as endpoint address and group resolution reply 424. In one example, address and group resolution module 342 may forward overlay address and group resolution request 444 to distributed policy service 142 by encapsulating endpoint address and group resolution request 420 with a tunnel header and forwarding the packet through tunnels 140 to distributed policy service 142. In the example, distributed policy service 142 may resolve overlay address and group resolution request 444 against one or more entries, such as entry 350, which includes a virtual IP address 352 assigned to one or more physical addresses 354, and a VG ID 356. In another example, address and group resolution module 342 may respond to endpoint address and group resolution request 420 by encapsulating an ARP request 436 directed to a broadcast IP address for resolving virtual IP address 422 and sending the encapsulated ARP request to a multicast IP address via tunnels 140 to NIC 146 and receives one or more ARP response 438 with any physical addresses and VG ID's resolved for virtual IP address 422. In the example, a virtual switch on one or more hosts reading the ARP request may respond to the ARP request to resolve the physical address and VG ID assigned to a virtual IP address based on VM addressing for VM 114 and VM 116 and a configured VG ID for VG 112 stored in VM group and routing 312.

In the example, address and group resolution module 342 returns the physical address and VG ID, if any, resolved for virtual IP address 422 to virtual switch 310 as physical addresses and a VG ID 426 in an endpoint address and group resolution reply 424. In the example, virtual switch 310 filters data packet 402 based on a particular group policy specified in group policy 160 for communications between the VG ID returned in endpoint address and group resolution reply 324 for the source and the VG ID for VG 112 for the destination. In the example, if the particular group policy specified in group policy 160 allows communication between the identified VGs for a multicast communication, then virtual switch 310 may forward data packet 402 to both VM 114 and VM 116 according to routing specified in VM group and routing 312. In the example, VM group and routing 312 may include addresses, routing, a VG ID, and other information required by virtual switch 310 to provide an interface to the VMs on host 110. In the example, if the particular group policy specified in group policy 160 does not allows communication between the identified VGs for a multicast communication, then virtual switch 310 drops data packet 402 and, if virtual switch 310 includes an error protocol, may trigger an error through the error protocol.

In the example, by address and group resolution module 342 providing a function to resolve a VG ID configured for a source virtual IP address in a multicast data packet, multicast data packets may be filtered according to virtual group policies at each of the hosts receiving the multicast data packets, without requiring the VG ID of the source virtual IP address to be identified in the packet header of the multicast data packet to be filtered.

FIG. 5 illustrates a block diagram of one example of the endpoint address and group resolution request, overlay address and group resolution request, overlay address and group resolution response, and endpoint address and group resolution response data packets that may be passed between virtual switches, address and group resolution modules and distributed policy services within an overlay network environment to resolve the physical addresses and VG ID associated with a virtual IP address.

In the example, an endpoint address and group resolution request 502 may include multiple types of data, including, but not limited to, a sequence number 504, identifying the position of the request within a sequence of requests, a request type 506 identifying the type of request, and a virtual switch ID 508 identifying one or more types of addressing for the virtual switch sending endpoint address and group resolution request 502. In the example, request type 506 may include one or more types of requests for data associated with virtual IP address 510 including, but not limited to, a request for connectivity addressing between a source virtual IP address 510 and a destination virtual IP address 512, a request for the physical addresses and VG ID associated with one of source virtual IP address 510 or destination virtual IP address 512, a request for only the physical addresses associated with one of source virtual IP address 510 or destination virtual IP address 512, a request for only the VG ID associated with one of source virtual IP address 510 or destination virtual IP address 512, and a request for other types of information associated with virtual IP address 510. For example, for a unicast data packet, virtual switch 310 may set request type 506 for connectivity between source virtual IP address 510 and destination virtual IP address 512 and may request a VG ID associated with destination virtual IP address 512. For example, for a multicast data packet, virtual switch 310 may set request type 506 for only a request for a VG ID associated with destination virtual IP address 512. In the example, a virtual switch, such as virtual switch 310 may pass endpoint address and group resolution request 502 to an address and group resolution module, such as address and group resolution module 342.

In the example, an address and group resolution module receiving endpoint address and group resolution request 502 may log the request and, if the request cannot be resolved against a local table, may decide to resolve the request by sending an overlay address and group resolution request 514 to distributed policy service 142. In the example, overlay address and group resolution request 514 may include multiple types of data, including, but not limited to, an encoding header 516 that identifies a location of host 110 and the location of distributed policy service 142, and may include tunnel headers for the physical pathways for routing overlay address and group resolution request 514 to distributed policy service 142 over tunnels 140. In addition, overlay address and group resolution request 514 may include one or more of sequence number 504, request type 506, a source host address 518, source virtual IP address 510, and destination virtual IP address 512. In one example, virtual switch ID 508 and other information included in endpoint address and group resolution request 502 may not be included in overlay address and group resolution request 514 to minimize the amount of data included in overlay address and group resolution request 514 and to provide additional data security for addressing information within a host.

In the example, distributed policy service 142 may resolve the request in overlay address and group resolution request 514 by identifying one or more of physical addresses providing connectivity and a VG ID associated with the virtual IP address in the request. In the example, distributed policy service 142 may return an overlay address and group resolution response 520 including encoding header 516 for encoding the return path of overlay address and group resolution response 520 to the host identified in encoding header 516, sequence number 504, and request type 506, and adding one or more of physical addresses 522 and VG ID 524.

In the example, the address and group resolution module receiving overlay address and group resolution response 520 may look up the sequence number in overlay address and group resolution response 520, determine the matching endpoint address and group resolution request 502, and return an endpoint address and group resolution response 530 to the originating virtual switch identified in virtual switch ID 508. Endpoint address and group resolution response with sequence number 504, request type 506, virtual switch ID 508, physical addresses 522, and VG ID 524.

FIG. 6 illustrates a block diagram of one example of components of a group agent implemented within one or more of a virtual switch and a local module of an overlay interface of a host.

In the example, group agent 186 may include VM group and routing 602, where VM group and routing 602 may include a VG ID 604 for a VG configured to the virtual switch supported by group agent 186 and configured VMs 606 specifying the virtual IP addresses and forwarding paths of the VMs configured in the VG. In the example, group agent may include a configuration interface 622 through which a user may specify one or more of the identifier in VG ID 604 and the VMs included in configured VMs 606. In another example, configuration interface 622 may automatically assign an identifier to VG ID 604 and may automatically detect the configuration information for VMs configured on a virtual switch and place the configuration information in configured VMs 606. In addition, configuration interface 620 may report the information in VG ID and configured VMs 606 to distributed policy service 142 for updating address and group table 162.

In the example, group agent 186 may include local group policy 610, where local group policy 610 includes a local copy of a public policy 612, such as group policy 160, accessed from distributed policy service 142, and includes a local copy of private policy 614, such as group policy that is set for application within a particular host, but is not distributed within overlay network environment 100 as part of group policy 160. In one example, a user may specify group policies to be published to distributed policy service 142 as public policy or to be maintained in private policy 612 through configuration interface 622. Configuration interface 622 may report the information updated by a user in public policy 612 to distributed policy service 142 for updating group policy 160.

In the example, group agent 186 may include a policy controller 620 for directing, through one or more of the virtual switch and the local module, the determination of whether a data packet should be filtered based on rule 630, which directs that a unicast packet on a source host should be filtered according to local group policy 610, or based on rule 632, which directs that a multicast packet on a destination host should be filtered according to local group policy 610. In addition, policy controller 620 may direct a virtual switch to request an address and group resolution for a data packet and upon receipt of the VG ID for a resolved virtual IP address and to apply the entry within local group policy 610 for correspondence between VG ID 604 and the resolved VG ID. Policy controller 620 may direct a virtual switch to drop packets where local group policy 610 does not allow for the communication or where the VG ID is not resolved for the data packet.

In the example, group agent 186 may include an ARP interface 624 for detecting ARP requests received by an overlay interface, determining whether any of the VMs within configured VMs 605 match the ARP request, and if a match is found, inserting VG ID 604 into the ARP response. In addition, ARP interface 624 may detect other types of addressing requests and determine whether to insert VG ID 604 into any response to be returned in response to the addressing request.

In the example, group agent 186 may include switch and module interface 626 for providing one or more interfaces between one or more of the functions or data of group agent 186 and one or more of the components of overlay interface 170 including, but not limited to, virtual switch 172 and local module 174. In the example, across overlay network environment 100 each host may run virtualization layers of different types, makes, and protocol basis for managing VMs, including implementing different types of hypervisor layers that may be provided by different entities. In the example, switch and module interface 626 may provide interfaces for multiple types of virtual switches, multiple types of local modules, and other components of an overlay layer, to provide the communication interfaces required for group agent 186 to be integrated into different types of virtual switches, local modules, and other overlay interface components. In particular, in the example, group agent 186 may include one or more functions that may be integrated into an existing overlay interface infrastructure within a host or that may be integrated into an overlay interface for installation on a host, where switch and module interface 626 provides the interfaces necessary to connect group agent 186 within an existing overlay interface or within components of an overlay interface to be installed on a host. In one example, switch and module interface 626 may provide interfaces for converting data into a different protocol or for converting a command into a different command structure. In addition, group agent 186 may be implemented as a functional component of an overlay interface, without requiring switch and module interface 626.

In the example, group agent 186 may be implemented, updated, and maintained by one entity within an overlay interface that is implemented, updated, and maintained by other entities or by the same entity. Since implementation of group agent 186 does not require the additional of a VG ID to a data packet when transmitted across physical infrastructure 144, group agent 186 may be integrated into an overlay network environment without requiring all the overlay interfaces to be updated to add, encapsulate, and read VG IDs from data packet headers.

Figure 7:
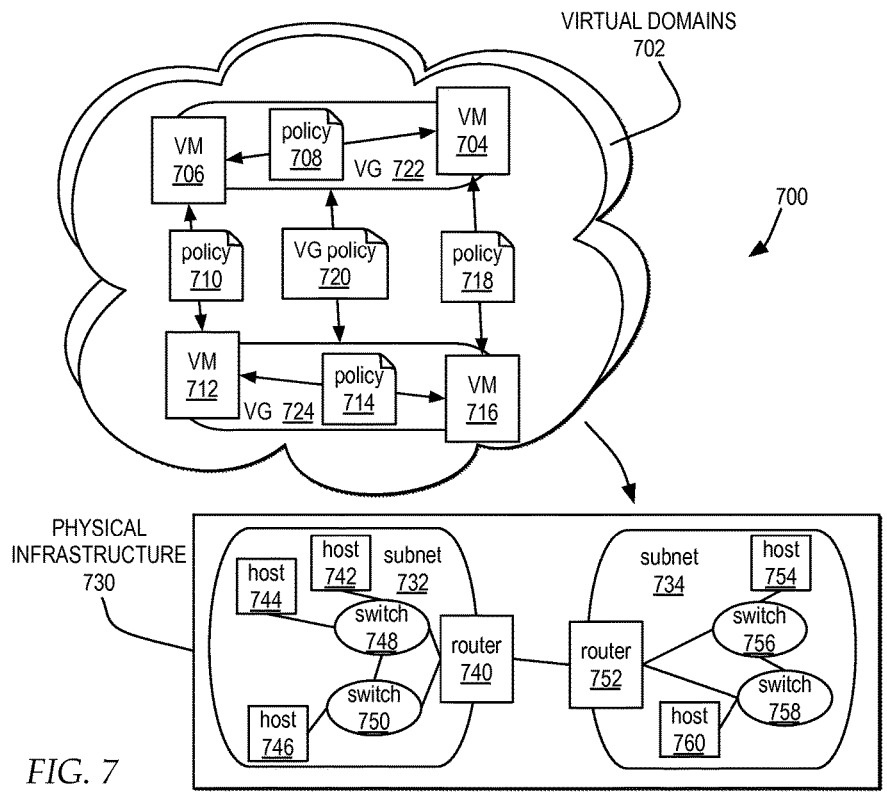
FIG. 7 is a block diagram illustrating one example of virtual network abstractions overlayed onto a physical network in which an overlay network environment may be implemented.

With reference now to FIG. 7, a block diagram illustrates one example of virtual network abstractions overlayed onto a physical network in which an overlay network environment may be implemented. One of ordinary skill in the art will appreciate that overlay network environment 700 is illustrative of one type of network environment that may support endpoint-to-endpoint connectivity over a shared physical network infrastructure. In addition, one of ordinary skill in the art will appreciate that the distribution of systems within overlay network environment 700 is illustrative of a distribution of systems, however, other distributions of systems within a network environment may be implemented.

In the example, virtual domains 702 are part overlay network environment 700, which includes policies that provide an end-to-end virtual connectivity between virtual network endpoints, such as VMs. In the example, the policies illustrated include a policy 708 that specifies the end-to-end connectivity between VM 706 and VM 704, a policy 710 that specifies the end-to-end connectivity between VM 706 and VM 712, a policy 714 that specifies the end-to-end connectivity between VM 712 and VM 716, and a policy 718 that specifies the end-to-end connectivity between VM 704 and VM 716. When a source VM sends a data packet to a destination VM, a policy corresponding to the two VMs describes a logical path on which the data travels. Policies defined how different virtual machines communicate with each other or with external networks. In one example, distributed policy service 142 may specify each of these individual policies through entries in address and group table 162 and may distribute these policies to virtual switches within overlay networks in response to address and group resolution requests. As will be appreciated by one of ordinary skill in the art, some of virtual domains 702 may include a portion of virtual machines 704, 706, 712, and 716, while other virtual domains may include additional or alternate virtual machines and additional or alternate policies.

In addition, in the example, overlay network environment 700 support configuring VMs into VGs and applying virtual group policies to define whether different machines are allowed to communication with one another within overlay network environment 700. In the example, VM 704 and VM 706 are configured in a VG 722 and VM 712 and VM 716 are configured in a VG 724. A VG policy 720 specifies whether communications are allowed between VMs in VG 722 are allowed with VMs in VG 724. In one example, for unicast data packets, such as from VM 706 to VM 712, VG policy 720 is applied at the source VM host system to determine whether to drop the data packets or to allow the host to apply a specific policy for forwarding the data packets to the intended destination. In one example, for multicast data packets, such as for a multicast by VM 706, VG policy 720 is applied at each destination VM host system to determine whether to drop the data packets or to allow the host to forward the data packets to the destination VMs.

Virtual domains 702 are logically overlayed onto physical infrastructure 730, which includes physical entities including, but not limited to, hosts, switches, and routers. For example, physical infrastructure 730 includes a subnet 732 including a host 742 and host 744 connected to a switch 748, a host 746 connected to a switch 750, switch 750 connected to switch 748, switch 750 and switch 748 connected to a router 740 and a subnet 734 including a host 754 connected to a switch 756, switch 756 connected to a router 752 and a switch 758, and switch 758 connected to host 760. Router 740 of subnet 732 is connected to router 752 of subnet 734. While the way in which policies are enforced in the system affects and depends on physical infrastructure 730, virtual domains 702 are more dependent upon logical descriptions in the policies. As such, multiple virtual domains 702 may be overlayed onto physical infrastructure 730. Virtual domains 702 are independent of physical constraints of physical infrastructure 730, such as being independent of L2 layer constraints within subnet 732 or subnet 734. Therefore, a virtual network illustrated in virtual domains 702 may include physical entities included in both subnet 732 and subnet 734.

In one embodiment, the virtual network abstractions support address independence between different virtual domains 702. For example, two different virtual machines operating in two different virtual networks may have the same IP address. As another example, the virtual network abstractions support deploying virtual machines, which belong to the same virtual networks, onto different hosts that are located in different physical subnets. In another embodiment, virtual machines belonging to different virtual networks may be hosted on the same physical host. In yet another embodiment, the virtual network abstractions support virtual machine migration anywhere in a data center without changing the virtual machine's network address and losing its network connection.

In one example, as illustrated, physical infrastructure 730 may include multiple networks, such as subnet 732 and subnet 734, each including one or more network appliances such as routers and switches, one or more hosts, and additional or alternate connectivity infrastructure. In the example, the networks within physical infrastructure 730 may include permanent connections such as wire or fiber optics cables and temporary connections made through telephone connections and wireless transmission connections, for example, and may include routers, switches, gateways and other hardware to enable a communication channel between the systems connected via the networks. Subnet 732 and subnet 734 may each represent, but are not limited to, one or more of broadcast television networks, packet-switching based networks, telephony based networks, local area and wire area networks, public networks, and private networks. Physical infrastructure 730 may implement multiple types of network architectures.

Physical infrastructure 730, within subnet 732 and subnet 734, may implement one or more layers of one or more types of network protocol stacks which may include one or more of a physical layer, a link layer, a network layer, a transport layer, a presentation layer, and an application layer. For example, physical infrastructure 730, within subnet 732 and subnet 734, may implement one or more of the Transmission Control Protocol/Internet Protocol (TCP/IP) protocol stack or an Open Systems Interconnection (OSI) protocol stack. In addition, for example, physical infrastructure 730, within subnet 732 and subnet 734, may represent the worldwide collection of networks and gateways that use the TCP/IP suite of protocols to communicate with one another. Physical infrastructure 730, within subnet 732 and subnet 734, may implement a secure HTTP protocol layer or other security protocol for securing communications between systems.

Figure 8:
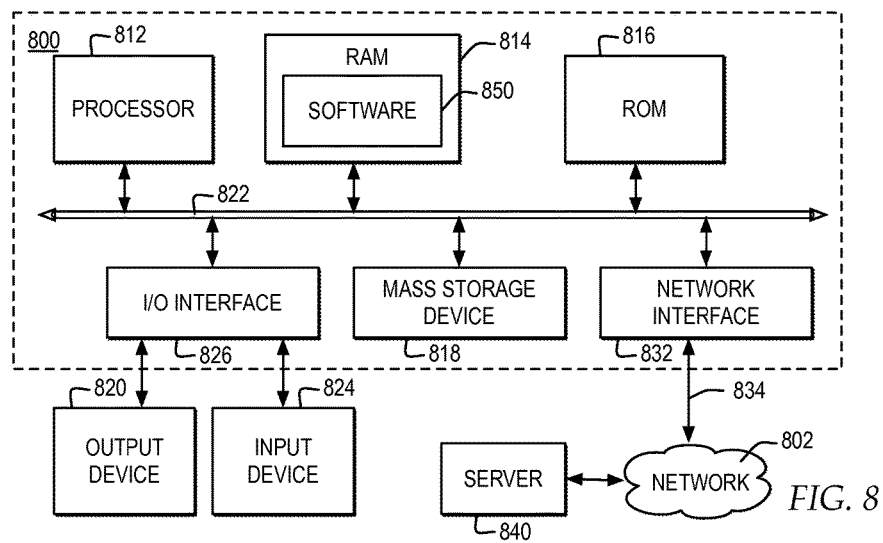
FIG. 8 is a block diagram illustrating one example of a computer system in which one embodiment of the invention may be implemented.

FIG. 8 illustrates a block diagram of one example of a computer system in which one embodiment of the invention may be implemented. The present invention may be performed in a variety of systems and combinations of systems, made up of functional components, such as the functional components described with reference to a computer system 800 and may be communicatively connected to or within a network, such as computer system 800 representing one or more hosts connected to a network such as subnet 732 or subnet 734 of physical infrastructure 730.

Computer system 800 includes a bus 822 or other communication device for communicating information within computer system 800, and at least one hardware processing device, such as processor 812, coupled to bus 822 for processing information. Bus 822 preferably includes low-latency and higher latency paths that are connected by bridges and adapters and controlled within computer system 800 by multiple bus controllers. When implemented as a server or node, computer system 800 may include multiple processors designed to improve network servicing power. Where multiple processors share bus 822, additional controllers (not depicted) for managing bus access and locks may be implemented.

Processor 812 may be at least one general-purpose processor such as IBM® PowerPC® processor that, during normal operation, processes data under the control of software 850, which may include at least one of application software, an operating system, middleware, and other code and computer executable programs accessible from a dynamic storage device such as random access memory (RAM) 814, a static storage device such as Read Only Memory (ROM) 816, a data storage device, such as mass storage device 818, or other data storage medium. Software 850 may include, but is not limited to, code, applications, protocols, interfaces, and processes for controlling one or more systems within a network including, but not limited to, an adapter, a switch, a server, a cluster system, and a grid environment.

Figure 9:
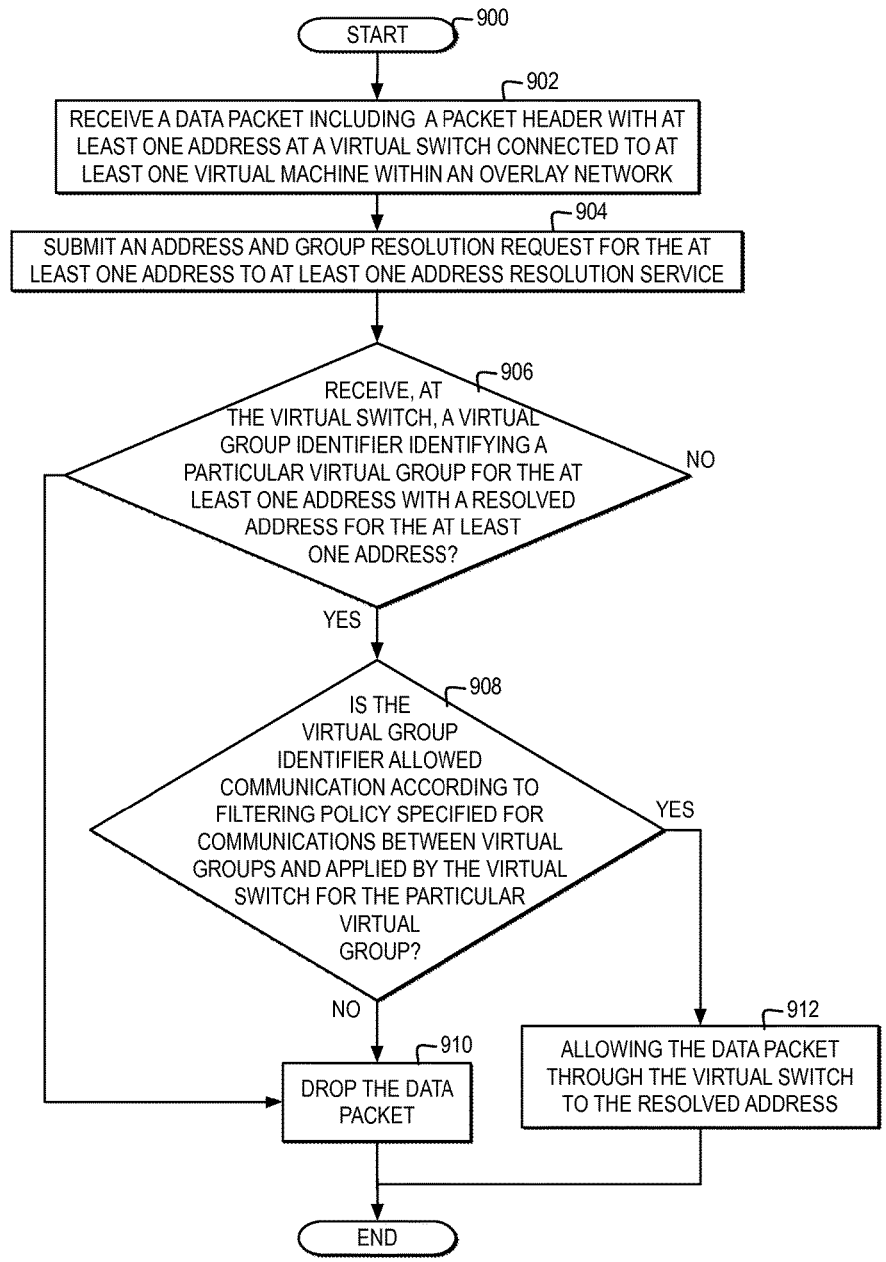
FIG. 9 is a high level logic flowchart illustrating one example of a process and program for managing packet filtering at a virtual switch layer of an overlay network.
Figure 10:
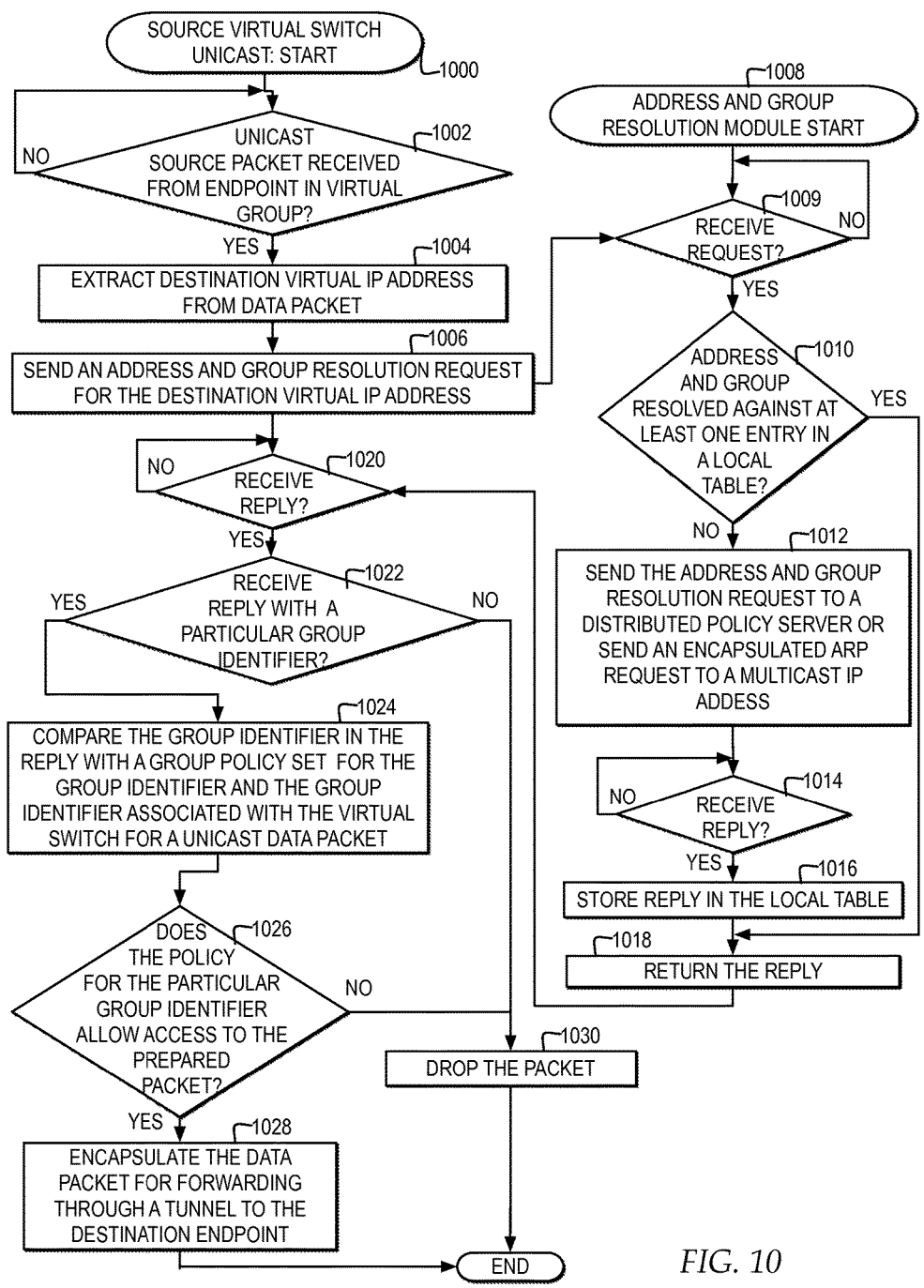
FIG. 10 is a high level logic flowchart illustrating one example of a process and program for managing packet filtering of a unicast data packet at a source virtual switch of a virtual switch layer of an overlay network.
Figure 11:
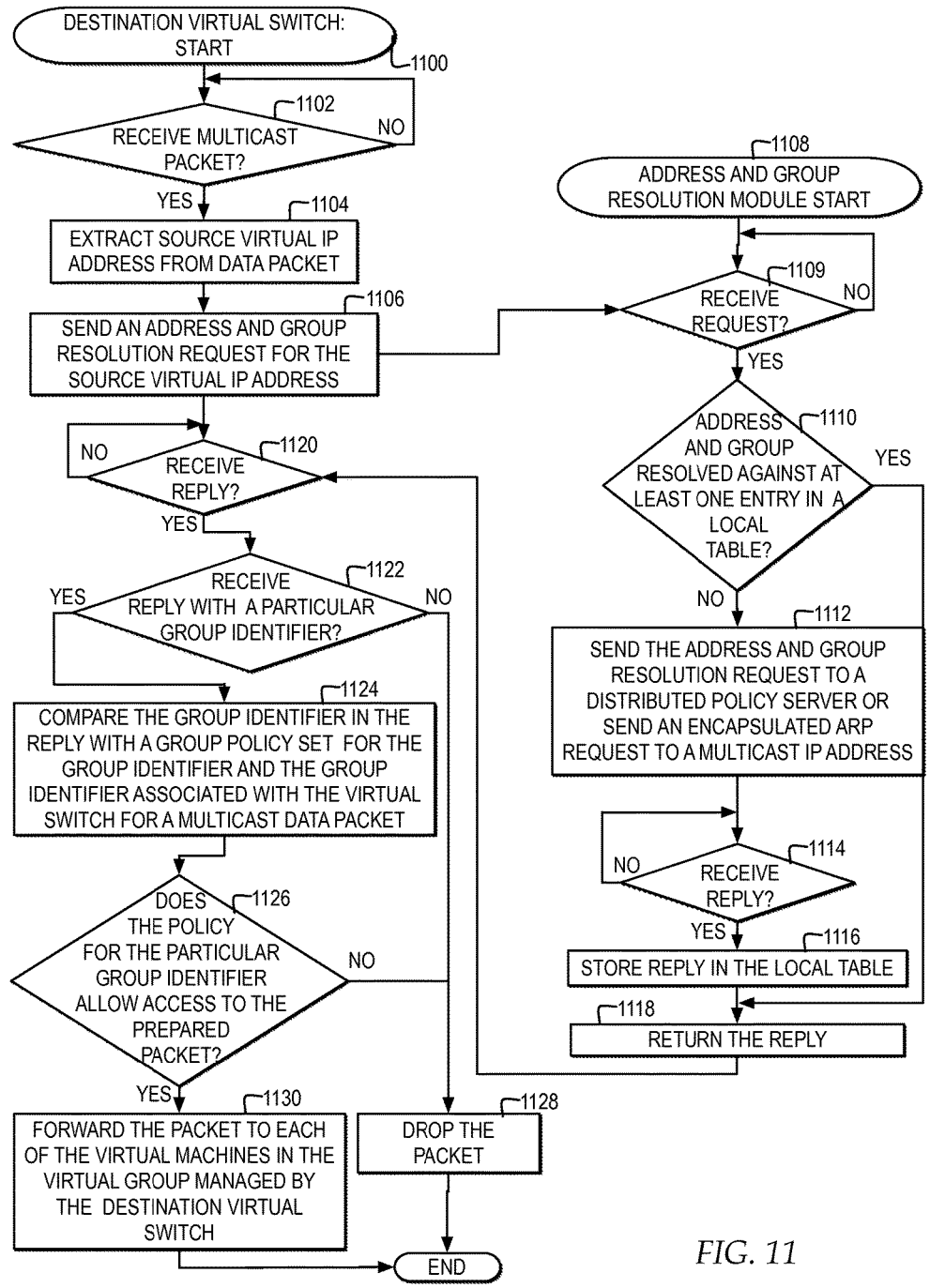
FIG. 11 is a high level logic flowchart illustrating one example of a process and program for managing packet filtering of a multicast data packet at a destination virtual switch of a virtual switch layer of an overlay network.

In one embodiment, the operations performed by processor 812 may control the operations of flowchart of FIGS. 9-11 and other operations described herein. Operations performed by processor 812 may be requested by software 850 or other code or the steps of one embodiment of the invention might be performed by specific hardware components that contain hardwired logic for performing the steps, or by any combination of programmed computer components and custom hardware components. In one embodiment, one or more components of computer system 800, or other components, which may be integrated into one or more components of computer system 800, may contain hardwired logic for performing the operations of flowcharts FIGS. 9-11.

Those of ordinary skill in the art will appreciate that aspects of one embodiment of the invention may be embodied as a system, method or computer program product. Accordingly, aspects of one embodiment of the invention may take the form of an entirely hardware embodiment, an entirely software embodiment (including firmware, resident software, micro-code, etc.) or an embodiment containing software and hardware aspects that may all generally be referred to herein as "circuit," "module," or "system." Furthermore, aspects of one embodiment of the invention may take the form of a computer program product embodied in one or more tangible computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, such as mass storage device 818, a random access memory (RAM), such as RAM 814, a read-only memory (ROM) 816, an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction executing system, apparatus, or device.

A computer readable signal medium may include a propagated data signal with the computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction executable system, apparatus, or device.

Program code embodied on a computer readable medium may be transmitted using any appropriate medium, including but not limited to, wireless, wireline, optical fiber cable, radio frequency (RF), etc., or any suitable combination of the foregoing.

Computer program code for carrying out operations of on embodiment of the invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, such as computer system 800, partly on the user's computer, as a stand-alone software package, partly on the user's computer and partly on a remote computer or entirely on the remote computer or server, such as server 840. In the latter scenario, the remote computer may be connected to the user's computer through any type of network, such as network 802, through a communication interface, such as network interface 832, over a link that may be connected, for example, to network 802. In one example, network 802 may represent physical infrastructure 730, or a subnet of physical infrastructure 730, within network overlay environment 700. In another example, network 802 may represent an additional or alternate network infrastructure that is outside of network overlay environment 700.

In the example, network interface 832 includes an adapter 834 for connecting computer system 800 to network 1002 through a link and for communicatively connecting computer system 800 to server 840 or other computing systems via network 702. Although not depicted, network interface 832 may include additional software, such as device drivers, additional hardware and other controllers that enable communication. When implemented as a server, computer system 800 may include multiple communication interfaces accessible via multiple peripheral component interconnect (PCI) bus bridges connected to an input/output controller, for example. In this manner, computer system 800 allows connections to multiple clients via multiple separate ports and each port may also support multiple connections to multiple clients.

One embodiment of the invention is described below with reference to flowchart illustrations and/or block diagrams of methods, apparatus (systems) and computer program products according to embodiments of the invention. Those of ordinary skill in the art will appreciate that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, such as computer system 800, or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer, such as computer system 800, or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Network interface 832, the network link to network 702, and network 702 may use electrical, electromagnetic, or optical signals that carry digital data streams. The signals through the various networks and the signals on network 702, the network link to network 702, and network interface 832 which carry the digital data to and from computer system 800, may be forms of carrier waves transporting the information.

In addition, computer system 800 may include multiple peripheral components that facilitate input and output. These peripheral components are connected to multiple controllers, adapters, and expansion slots, such as input/output (I/O) interface 826, coupled to one of the multiple levels of bus 822. For example, input device 824 may include, for example, a microphone, a video capture device, an image scanning system, a keyboard, a mouse, or other input peripheral device, communicatively enabled on bus 822 via I/O interface 826 controlling inputs. In addition, for example, output device 820 communicatively enabled on bus 822 via I/O interface 826 for controlling outputs may include, for example, one or more graphical display devices, audio speakers, and tactile detectable output interfaces, but may also include other output interfaces. In alternate embodiments of the present invention, additional or alternate input and output peripheral components may be added.

Those of ordinary skill in the art will appreciate that the hardware depicted in FIG. 8 may vary. Furthermore, those of ordinary skill in the art will appreciate that the depicted example is not meant to imply architectural limitations with respect to the present invention.

FIG. 9 illustrates one example of a high level logic flowchart of a process and program for managing packet filtering at a virtual switch layer of an overlay network.

In the example, the process and program starts at block 900 and thereafter proceeds to block 902. Block 902 illustrates receiving a data packet including a packet header with at least one address at a virtual switch connected to at least one virtual machine within an overlay network. Next, block 904 illustrates submitting an address and group resolution request for the at least one address to at least one address resolution service. Thereafter, block 906 illustrates a determination of whether the virtual switch receives a virtual group identifier identifying a particular virtual group for the at least one address with a resolved address for the at least one address. At block 906, if the virtual switch does not receive a virtual group identifier with the resolved address, then the process passes to block 910. Block 910 illustrated dropping the data packet, and the process ends.

Returning to block 906, if the virtual switch does receive a virtual group identifier with the resolved address, then the process passes to block 908. Block 908 illustrates a determination whether the virtual group identifier is allowed communication according to a filtering policy specified for communications between virtual groups and applied by the virtual switch for the particular virtual group. At block 908, if a determination is made that the virtual group identifier is allowed communication according to the filtering policy applied for the particular virtual group, then the process passes to block 912. Block 912 illustrates allowing the data packet through the virtual switch to the resolved address, and the process ends. At block 908 if a determination is made that the virtual group identifier is not allowed communication according to the filtering policy applied for the particular virtual group, then the process passes to block 910.

FIG. 10 illustrates one example of a high level logic flowchart of a process and program for managing packet filtering of a unicast data packet at a source virtual switch of a virtual switch layer of an overlay network.

In the example, a process and program starts at block 1000 and thereafter proceeds to block 1002. In one example, the process and program starts at block 1000 through a source virtual switch for a virtual group. Block 1002 illustrates a determination whether a unicast source packet is received from an endpoint in a virtual group by a virtual switch for the virtual group. At block 1002 if a virtual switch for a virtual group receives a unicast source packet from an endpoint within the virtual group, then the process passes to block 1004. Block 1004 illustrates extracting a destination virtual IP address from the data packet. Next, block 1006 illustrates sending an address and group resolution request for the destination virtual IP address to an address and group resolution module. Thereafter, block 1020 illustrates a determination whether a reply is received in response to the address and group resolution request.

As illustrated at reference numeral 1008, a process for an address and group resolution module starts at block 1008 and thereafter proceeds to block 1009. Block 1009 illustrates a determination whether a request is received. At block 1009, when a request is received, the process passes to block 1010. Block 1010 illustrates a determination whether, for a received an address and group resolution request for a destination virtual IP address, the address and group identifier are resolved against an entry in a local table. At block 1010, if the address and group identifier for a destination virtual IP address are resolved against an entry in a local table, then the process passes to block 1018. At block 1010, if the address and group identifier for the destination virtual IP address are not resolved against an entry in a local table, then the process passes to block 1012. Block 1012 illustrates sending the address and group resolution request for the destination virtual IP address to a distributed policy service or sending an encapsulated ARP request with the destination virtual IP address to a multicast IP address. Block 1014 illustrates a determination whether a reply is received. At block 1014, once a reply is received, the process passes to block 1016. Block 1016 illustrates storing the reply in the local table. Next, block 1018 illustrates returning the reply to the source virtual switch. In the example, at block 1014, after a timeout period, if the request is initially sent to the distributed policy server and the distributed policy server returns a response without the requested data, the address and group resolution module may also send an encapsulated ARP request to a multicast IP address to attempt to resolve the physical addresses and VG ID associated with a virtual IP address.

Returning to the process for the source virtual switch, at block 1020, when a reply is received, then the process passes to block 1022. Block 1022 illustrates a determination whether the source virtual switch receives a reply with a particular group identifier. At block 1022, if the reply does not include a particular group identifier, then the process passes to block 1030. Block 1030 illustrates dropping the packet, and the process ends. Returning to block 1022, if the reply does include a particular group identifier, then the process passes to block 1024. Block 1024 illustrates comparing the group identifier in the reply with a group policy set for the group identifier in the reply and the group identifier associated with the virtual switch for a unicast data packet. Next, block 1026 illustrates a determination whether the policy for the particular group identifier allows access to the prepared packet. At block 1026, if the policy for the particular group identifier allows access to the prepared packet, then the process passes to block 1028. Block 1028 illustrates encapsulating the data packet for forwarding through a tunnel to the destination endpoint, and the process ends. At block 1026, if the policy for the particular group identifier does not allow access to the prepared packet, then the process passes to block 1030.

FIG. 11 illustrates one example of a high level logic flowchart of a process and program for managing packet filtering of a multicast data packet at a destination virtual switch of a virtual switch layer of an overlay network.

In the example, a process and program starts at block 1100 and thereafter proceeds to block 1102. In one example, the process and program starts at block 1100 through a destination virtual switch for a virtual group. Block 1102 illustrates a determination whether a multicast packet is received at a destination virtual switch for a virtual group of at least one virtual machine in an overlay network. At block 1102 if a destination virtual switch for a virtual group receives a multicast packet, then the process passes to block 1104. Block 1104 illustrates extracting a source virtual IP address for the virtual machine that is the source of the data packet, from the data packet. Next, block 1108 illustrates sending an address and group resolution request for the source virtual IP address to an address and group resolution module. Thereafter, block 1120 illustrates a determination whether a reply is received in response to the address and group resolution request.

As illustrated at reference numeral 1108, a process for an address and group resolution module starts at block 1108 and thereafter proceeds to block 1109. Block 1109 illustrates a determination whether a request is received. At block 1109, when a request is received, the process passes to block 1110. Block 1110 illustrates a determination whether, for a received an address and group resolution request for a source virtual IP address, the address and group identifier are resolved against an entry in a local table. At block 1110, if the address and group identifier for a source virtual IP address are resolved against an entry in a local table, then the process passes to block 1118. At block 1110, if the address and group identifier for the source virtual IP address are not resolved against an entry in a local table, then the process passes to block 1112. Block 1112 illustrates sending the address and group resolution request for the source virtual IP address to a distributed policy service of the overlay network or sending an encapsulated ARP request with the virtual IP address to a multicast IP address. Block 1114 illustrates a determination whether a reply is received. At block 1114, once a reply is received, the process passes to block 1116. Block 1116 illustrates storing the reply in the local table. Next, block 1118 illustrates returning the reply to the source virtual switch. In the example, at block 1114, after a timeout period, if the request is initially sent to the distributed policy server and the distributed policy server returns a response without the requested data, the address and group resolution module may also send an encapsulated ARP request to a multicast IP address to attempt to resolve the physical addresses and VG ID associated with a virtual IP address.

Returning to the process for the source virtual switch, at block 1120, when a reply is received, then the process passes to block 1122. Block 1122 illustrates a determination whether the destination virtual switch receives a reply with a particular group identifier. At block 1122, if the reply does not include a particular group identifier, then the process passes to block 1128. Block 1128 illustrates dropping the packet, and the process ends. Returning to block 1122, if the reply does include a particular group identifier, then the process passes to block 1124. Block 1124 illustrates comparing the group identifier in the reply with a group policy set for communications between the group identifier in the reply and the group identifier associated with the virtual switch for a multicast data packet. Next, block 1126 illustrates a determination whether the policy for the particular group identifier allows access to the prepared packet. At block 1126, if the policy for the particular group identifier does not allow access to the prepared packet, then the process passes to block 1128. At block 1126, if the policy for the particular group identifier allows access to the prepared packet, then the process passes to block 1130. Block 1130 illustrates forwarding the packet to each of the virtual machines in the virtual group managed by the destination virtual switch, and the process ends.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, occur substantially concurrently, or the blocks may sometimes occur in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification specify the presence of stated features, integers, steps, operations, elements, and/or components, but not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the one or more embodiments of the invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

While the invention has been particularly shown and described with reference to one or more embodiments, it will be understood by those skilled in the art that various changes in form and detail may be made therein without departing from the spirit and scope of the invention.

What is claimed is:

1. A method comprising:
   receiving a data packet at a virtual switch connected to at least one virtual machine of a plurality of virtual machines communicatively connected through an overlay network, each of the plurality of virtual machines configured within a separate one of a plurality of virtual groups in the overlay network, the data packet comprising a packet header comprising at least one address, wherein each virtual group comprises only a plurality of virtual machines and each virtual group is identified by a virtual group identifier;
   receiving, by the virtual switch, a virtual group identifier for the at least one address from at least one address resolution service returning the virtual group identifier and a resolved address for the at least one address, in response to an address resolution request for the at least one address;
   sending the data packet through the virtual switch to the resolved address only if the virtual group identifier and a type of data packet transmission of the data packet is allowed according to a group filtering policy applied by the virtual switch for a particular virtual group identified by the virtual group identifier of the plurality of virtual groups, wherein the type of data packet transmission comprises one of a unicast data packet or a multicast data packet, wherein the group filtering policy specified a first policy for the virtual group identifier for the unicast data packet and a second policy for the virtual group identifier for the multicast data packet, wherein the virtual group identifier for the unicast data packet and the virtual group identifier for the multicast data packet are the same, and wherein the group filtering policy indicates that unicast data packets are filtered at a source host overlay interface and multicast data packets are filtered at a destination host overlay interface; and responsive to the virtual group identifier and the type of data packet transmission of the data packet not being allowed according to the group filtering policy applied by the virtual switch for the particular virtual group identified by the virtual group identifier, dropping the data packet.

2. The method according to claim 1, wherein receiving the data packet at the virtual switch connected to at least one virtual machine of the plurality of virtual machines communicatively connected through the overlay network, each of the plurality of virtual machines configured within a separate one of the plurality of virtual groups in the overlay network, the data packet comprising the packet header comprising at least one address, further comprises:

receiving the data packet at the virtual switch operating within a hypervisor layer of a host machine for managing a selection of the plurality of virtual machines hosted by the host machine.

3. The method according to claim 1, wherein receiving the data packet at the virtual switch connected to at least one virtual machine of the plurality of virtual machines communicatively connected through the overlay network, each of the plurality of virtual machines configured within a separate one of the plurality of virtual groups in the overlay network, the data packet comprising the packet header comprising at least one address, further comprises:

receiving the data packet at the virtual switch connected to at least one virtual machine of the plurality of virtual machines communicatively connected through the overlay network, wherein a plurality of host machines hosting the plurality of virtual machines pass data packets to one another through a physical infrastructure comprising a plurality of network routes, a plurality of network switches, and the plurality of host machines connected via a plurality of network connections, wherein a distributed policy service of the overlay network manages a plurality of policies for specifying a plurality of logical tunnels each comprising a particular path through a portion of the physical infrastructure between a separate pair of the plurality of virtual machines, wherein each of the host machines sends a data packet through a particular logical tunnel from among the plurality of logical tunnels by encapsulating the data packet with a tunnel header specifying the particular path and by forwarding the data packet through the tunnel header using a tunnel protocol.

4. The method according to claim 1,
wherein receiving the data packet at the virtual switch connected to at least one virtual machine of the plurality of virtual machines communicatively connected through the overlay network, each of the plurality of virtual machines configured within a separate one of the plurality of virtual groups in the overlay network, the data packet comprising the packet header comprising at least one address further comprises receiving the data packet as a unicast data packet at the virtual switch from a source virtual machine with the at least one address in the packet header comprising a destination virtual internet protocol address for a particular destination virtual machine;

wherein receiving, by the virtual switch, the virtual group identifier for the at least one address from at least one address resolution service returning the virtual group identifier and the resolved address for the at least one address, in response to the address resolution request for the at least one address further comprises receiving the virtual group identifier for the particular destination virtual machine; and wherein sending the data packet through the virtual switch to the resolved address only if the virtual group identifier is allowed according to the group filtering policy applied by the virtual switch for the particular virtual group identified by the virtual group identifier of the plurality of virtual groups further comprises allowing the virtual switch to encapsulate the data packet with a tunnel header with a physical path through a tunnel of a physical infrastructure of the overlay network to a host system hosting the particular destination virtual machine, wherein the host system decapsulates the encapsulated data packet by removing the tunnel header and forwards the data packet to the particular destination virtual machine from among a plurality of virtual machines hosted by the host system.

5. The method according to claim 1,
wherein receiving the data packet at the virtual switch connected to at least one virtual machine of the plurality of virtual machines communicatively connected through the overlay network, each of the plurality of virtual machines configured within a separate one of the plurality of virtual groups in the overlay network, the data packet comprising the packet header comprising at least one address further comprises receiving the data packet at the virtual switch as a multicast data packet sent by a source virtual machine with the at least one address in the packet header comprising a destination virtual internet protocol address for a multicast internet protocol address;

wherein receiving, by the virtual switch, the virtual group identifier for the at least one address from at least one address resolution service returning the virtual group identifier and the resolved address for the at least one address, in response to the address resolution request for the at least one address further comprises receiving the virtual group identifier for the source virtual machine; and wherein sending the data packet through the virtual switch to the resolved address only if the virtual group identifier is allowed according to the group filtering policy applied by the virtual switch for the particular virtual group identified by the virtual group identifier of the plurality of virtual groups further comprises allowing the virtual switch to forward the data packet to each of a selection of virtual machines from among the plurality of virtual machines associated with a second virtual group from among the plurality of virtual groups, wherein the virtual switch resides on a host system that hosts the selection of virtual machines in the second virtual group.

6. The method according to claim 1, wherein sending the data packet through the virtual switch to the resolved address only if the virtual group identifier is allowed according to the group filtering policy applied by the virtual switch for the particular virtual group identified by the virtual group identifier of the plurality of virtual groups further comprises:

accessing the group filtering policy for communications between the virtual group identifier and a second virtual group identifier assigned to the second virtual group configured through the virtual switch.

7. The method according to claim 1, wherein receiving, by the virtual switch, the virtual group identifier for the at least one address from at least one address resolution service returning the virtual group identifier and the resolved address for the at least one address, in response to the address resolution request for the at least one address further comprises:
sending an endpoint and group address resolution request for the at least one address from the virtual switch to a local module comprising an address and group resolution module;
determining, by the address and group resolution module where the at least one address is resolved in a local table stored by the address and group resolution module with entries identifying physical addresses and a virtual group identifier associated with a virtual internet protocol address;
responsive to the address and group resolution module not resolving the at least one address in the local table, sending an overlay address and group resolution request to a distributed policy service that maintains a central address, policy and group table for the overlay network comprising a separate entry for each virtual internet protocol address within the overlay network and associated physical addresses and virtual group identifier; and
responsive to the address and group resolution module not resolving the at least one address through the distributed policy service, sending a multicast address resolution protocol request to resolve the at least one address within the overlay network.

8. A system comprising:
one or more processors;
a memory coupled to at least one of the processors;
a set of computer program instructions stored in the memory and executed by at least one of the processors in order to perform actions of:
receiving a data packet at a virtual switch connected to at least one virtual machine of a plurality of virtual machines communicatively connected through an overlay network, each of the plurality of virtual machines configured within a separate one of a plurality of virtual groups in the overlay network, the data packet comprising a packet header comprising at least one address, wherein each virtual group comprises only a plurality of virtual machines and each virtual group is identified by a virtual group identifier;
receiving, by the virtual switch, a virtual group identifier for the at least one address from at least one address resolution service returning the virtual group identifier and a resolved address for the at least one address, in response to an address resolution request for the at least one address;
sending the data packet through the virtual switch to the resolved address only if the virtual group identifier and a type of data packet transmission of the data packet is allowed according to a group filtering policy applied by the virtual switch for a particular virtual group identified by the virtual group identifier of the plurality of virtual groups, wherein the type of data packet transmission comprises one of a unicast data packet or a multicast data packet, wherein the group filtering policy specified a first policy for the virtual group identifier for the unicast data packet and a second policy for the virtual group identifier for the multicast data packet, wherein the virtual group identifier for the unicast data packet and the virtual group identifier for the multicast data packet are the same, and wherein the group filtering policy indicates that unicast data packets are filtered at a source host overlay interface and multicast data packets are filtered at a destination host overlay interface; and
responsive to the virtual group identifier and the type of data packet transmission of the data packet not being allowed according to the group filtering policy applied by the virtual switch for the particular virtual group identified by the virtual group identifier, dropping the data packet.

9. The system according to claim 8, wherein the processors perform additional actions comprising:
receiving the data packet at the virtual switch operating within a hypervisor layer of a host machine for managing a selection of the plurality of virtual machines hosted by the host machine.

10. The system according to claim 8, wherein the processors perform additional actions comprising:
receiving the data packet at the virtual switch connected to at least one virtual machine of the plurality of virtual machines communicatively connected through the overlay network, wherein a plurality of host machines hosting the plurality of virtual machines pass data packets to one another through a physical infrastructure comprising a plurality of network routes, a plurality of network switches, and the plurality of host machines connected via a plurality of network connections, wherein a distributed policy service of the overlay network manages a plurality of policies for specifying a plurality of logical tunnels each comprising a particular path through a portion of the physical infrastructure between a separate pair of the plurality of virtual machines, wherein each of the host machines sends a data packet through a particular logical tunnel from among the plurality of logical tunnels by encapsulating the data packet with a tunnel header specifying the particular path and by forwarding the data packet through the tunnel header using a tunnel protocol.

11. The system according to claim 8, wherein the processors perform additional actions comprising:
wherein receiving the data packet at the virtual switch connected to at least one virtual machine of the plurality of virtual machines communicatively connected through the overlay network, each of the plurality of virtual machines configured within a separate one of the plurality of virtual groups in the overlay network, the data packet comprising the packet header comprising at least one address further comprises receiving the data packet as a unicast data packet at the virtual switch from a source virtual machine with the at least one address in the packet header comprising a destination virtual internet protocol address for a particular destination virtual machine;
wherein receiving, by the virtual switch, the virtual group identifier for the at least one address from at least one address resolution service returning the virtual group identifier and the resolved address for the at least one address, in response to the address resolution request for the at least one address further comprises receiving the virtual group identifier for the particular destination virtual machine; and wherein sending the data packet through the virtual switch to the resolved address only if the virtual group identifier is allowed according to the group filtering policy applied by the virtual switch for the particular virtual group identified by the virtual group identifier of the plurality of virtual groups further comprises allowing the virtual switch to encapsulate the data packet with a tunnel header with a physical path through a tunnel of a physical infrastructure of the overlay network to a host system hosting the particular destination virtual machine, wherein the host system decapsulates the encapsulated data packet by removing the tunnel header and forwards the data packet to the particular destination virtual machine from among a plurality of virtual machines hosted by the host system.

12. The system according to claim 8, wherein the processors perform additional actions comprising:

wherein receiving the data packet at the virtual switch connected to at least one virtual machine of a plurality of virtual machines communicatively connected through the overlay network, each of the plurality of virtual machines configured within a separate one of the plurality of virtual groups in the overlay network, the data packet comprising the packet header comprising at least one address further comprises receiving the data packet at the virtual switch as a multicast data packet sent by a source virtual machine with the at least one address in the packet header comprising a destination virtual internet protocol address for a multicast internet protocol address;

wherein receiving, by the virtual switch, the virtual group identifier for the at least one address from at least one address resolution service returning the virtual group identifier and the resolved address for the at least one address, in response to the address resolution request for the at least one address further comprises receiving the virtual group identifier for the source virtual machine; and wherein sending the data packet through the virtual switch to the resolved address only if the virtual group identifier is allowed according to the group filtering policy applied by the virtual switch for the particular virtual group identified by the virtual group identifier of the plurality of virtual groups further comprises allowing the virtual switch to forward the data packet to each of a selection of virtual machines from among the plurality of virtual machines associated with a second virtual group from among the plurality of virtual groups, wherein the virtual switch resides on a host system that hosts the selection of virtual machines in the second virtual group.

13. The system according to claim 8, wherein the processors perform additional actions comprising:

accessing the group filtering policy for communications between the virtual group identifier and a second virtual group identifier assigned to the second virtual group configured through the virtual switch.

14. A computer program product comprising a computer readable storage medium, wherein the computer readable storage medium is non-transitory, the computer readable storage medium having program code embodied therewith, the program code executable by a computer system to:

receive, by a computer system, a data packet at a virtual switch connected to at least one virtual machine of a plurality of virtual machines communicatively connected through an overlay network, each of the plurality of virtual machines configured within a separate one of a plurality of virtual groups in the overlay network, the data packet comprising a packet header comprising at least one address, wherein each virtual group comprises only a plurality of virtual machines and each virtual group is identified by a virtual group identifier;

receive, by the computer system, at the virtual switch, a virtual group identifier for the at least one address from at least one address resolution service returning the virtual group identifier and a resolved address for the at least one address, in response to an address resolution request for the at least one address;

send, by the computer system, the data packet through the virtual switch to the resolved address only if the virtual group identifier and a type of data packet transmission of the data packet is allowed according to a group filtering policy applied by the virtual switch for a particular virtual group identified by the virtual group identifier of the plurality of virtual groups, wherein the type of data packet transmission comprises one of a unicast data packet or a multicast data packet, wherein the group filtering policy specified a first policy for the virtual group identifier for the unicast data packet and a second policy for the virtual group identifier for the multicast data packet wherein the virtual group identifier for the unicast data packet and the virtual group identifier for the multicast data packet are the same, and wherein the group filtering policy indicates that unicast data packets are filtered at a source host overlay interface and multicast data packets are filtered at a destination host overlay interface; and responsive to the virtual group identifier and the type of data packet transmission of the data packet not being allowed according to the group filtering policy applied by the virtual switch for the particular virtual group identified by the virtual group identifier, drop, by the computer system, the data packet.

15. The computer program product according to claim 14, further comprising the program code executable by the computer system to:

access, by the computer system, the group filtering policy for communications between the virtual group identifier and a second virtual group identifier assigned to the second virtual group configured through the virtual switch.

* * * * *